(12) United States Patent
Sharma et al.

(10) Patent No.: US 12,008,816 B2
(45) Date of Patent: Jun. 11, 2024

(54) METHOD AND SYSTEM FOR REAL TIME OBJECT DETECTION

(71) Applicant: HL Klemove Corp., Pyeongtaek (KR)

(72) Inventors: Vipin Sharma, Haryana (IN); Akshat Agrawal, Haryana (IN); Jitesh Kumar Singh, Karnataka (IN); Arpit Awasthi, Haryana (IN)

(73) Assignee: HL KLEMOVE CORP., Incheon (KR)

( * ) Notice: Subject to any disclaimer, the term of this patent is extended or adjusted under 35 U.S.C. 154(b) by 245 days.

(21) Appl. No.: 17/540,172

(22) Filed: Dec. 1, 2021

(65) Prior Publication Data

US 2022/0180107 A1 Jun. 9, 2022

(30) Foreign Application Priority Data

Dec. 3, 2020 (IN) .............................. 202011052691

(51) Int. Cl.
| | | |
|---|---|---|
| *G06V 20/56* | (2022.01) | |
| *G06F 18/24* | (2023.01) | |
| *G06N 3/04* | (2023.01) | |
| *G06V 10/32* | (2022.01) | |
| *G06V 10/40* | (2022.01) | |
| *G06V 10/94* | (2022.01) | |

(52) U.S. Cl.
CPC .............. *G06V 20/56* (2022.01); *G06F 18/24* (2023.01); *G06N 3/04* (2013.01); *G06V 10/32* (2022.01); *G06V 10/40* (2022.01); *G06V 10/95* (2022.01)

(58) Field of Classification Search
CPC ........ G06V 20/56; G06V 10/32; G06V 10/40; G06V 10/95; G06F 18/24; G06N 3/04
See application file for complete search history.

(56) References Cited

U.S. PATENT DOCUMENTS

| | | | | |
|---|---|---|---|---|
| 11,527,077 | B2* | 12/2022 | Ko | G06V 10/462 |
| 11,769,052 | B2* | 9/2023 | Kwon | G06N 3/08 |
| 2017/0206431 | A1 | 7/2017 | Sun | |
| 2019/0152379 | A1* | 5/2019 | Biswal | B60Q 1/143 |
| 2019/0279000 | A1* | 9/2019 | Pfeifle | G08G 1/165 |
| 2020/0218979 | A1* | 7/2020 | Kwon | B60W 30/14 |
| 2020/0250442 | A1* | 8/2020 | Kim | G06V 10/454 |
| 2021/0150230 | A1* | 5/2021 | Smolyanskiy | G06V 20/56 |
| 2021/0261146 | A1* | 8/2021 | Inoue | B60R 16/0373 |
| 2021/0309214 | A1* | 10/2021 | Hashimoto | B60W 60/00272 |
| 2022/0101024 | A1* | 3/2022 | Zhang | G06V 20/58 |

* cited by examiner

*Primary Examiner* — Utpal D Shah
(74) *Attorney, Agent, or Firm* — Harvest IP Law, LLP

(57) ABSTRACT

The present disclosure relates to a method for real-time object detection, the method comprising: capturing an image in vicinity of a vehicle; feeding the captured image to a deep fully convolution neural network; extracting one or more relevant features from the captured image; classifying the extracted features using one or more branches to identify different size of objects; predicting objects present in the image based on a predetermined confidence threshold; and marking the predicted objects in the image.

11 Claims, 24 Drawing Sheets

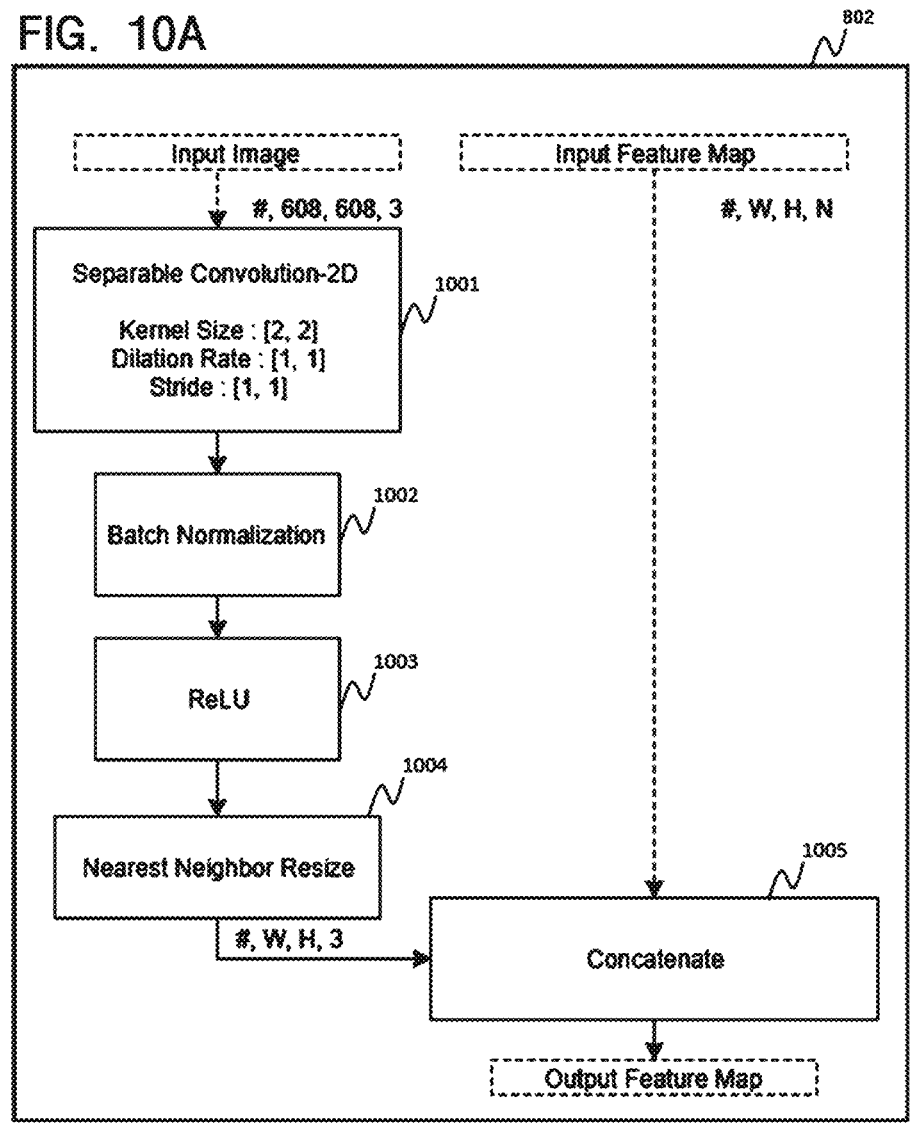

METHOD AND SYSTEM FOR REAL TIME OBJECT DETECTION

CROSS-REFERENCE TO RELATED APPLICATION

This application claims priority to and the benefit of India Patent Application No. 202011052691, filed on Dec. 3, 2020, the disclosure of which is incorporated herein by reference in its entirety.

TECHNICAL FIELD

The present disclosure relates to field of autonomous driving. More particularly to real-time object detection.

BACKGROUND

The information in this section merely provide background information related to the present disclosure and may not constitute prior art(s).

Object detection has been an area of heavy research for the past few years in the computer vision community. The goal of object detection is to detect all types of objects in all instances from a known class, such as people, cars or faces in an image, but not limited thereto. Pedestrian detection being one of the most challenging and researched fields in object detection. An accurate and fast object detection system is useful in many scenarios including, but not limited to, security surveillance, advanced driving assistance systems, autonomous cars, etc.

Deploying pedestrian detection system is a relatively difficult task as we need to make accurate detections in real time to get some meaningful output signals out of it (such as distance, pedestrian counts, locations, etc.) without many false alarms or missed detections. Inconsistent detections can lead to fatal accidents in the real-world scenario.

Most of the prior art algorithms use conventional cameras for doing pedestrian detection which have a very distant range of view along their line of sight, but they don't have a large field of view (FOV) and have blind spots near the area where cameras are mounted (~4-6 m), leading to no detections in that region. The above-mentioned point makes the prior art algorithms unfavorable to deploy in systems such as autonomous vehicles, where many pedestrians/toddlers, closer to the camera mount point will never get detected which can result in causalities.

Fish-eye camera solves the problem of blind spots in camera's FOV. Using a fish-eye camera a large FOV can be achieved, but at the cost of distortion, adding to the difficulty in real-time object detection.

Apart from cameras, a lot of research has also been done on the topic of pedestrian detection in the prior art based on different sensors. However, the problem with different sensors like ultrasonic sensors, radar, etc. is that they cannot localize very well. Various methodologies based on computer vision have also been tried and tested in the prior art, but they tend to have a lot of thresholds and don't generalize well. Thus, such methods lack accuracy.

Machine Learning has been used to solve above problems in prior arts, but such methods require different models for handling the cases of partial pedestrians, occlusions, different pedestrian visibility, etc., with each model adding to the computation cost. Some deep learning methodologies also found available; however, these have a large sized model which cannot be deployed on a system because they require a very high computation and runs at a very low speed.

Therefore, it is highly desirable to provide an efficient real-time object detection technique with higher accuracy.

SUMMARY OF THE INVENTION

One or more shortcomings of the prior art are overcome, and additional advantages are provided by the present disclosure. Additional features and advantages are realized through the techniques of the present disclosure. Other embodiments and aspects of the disclosure are described in detail herein and are considered a part of the disclosure.

It is to be understood that the aspects and embodiments of the disclosure described above may be used in any combination with each other. Several of the aspects and embodiments may be combined together to form a further embodiment of the disclosure.

In an aspect, the present disclosure provides a method for real-time object detection for a host vehicle, comprising: capturing an image in vicinity of the vehicle; feeding the captured image to a deep fully convolution neural network; extracting one or more relevant features from the captured image; classifying the extracted features using one or more branches to identify different size of objects; predicting objects present in the image based on a predetermined confidence threshold; and marking the predicted objects in the image; and plotting the marked image on a display.

In another aspect, the present disclosure provides a method, wherein capturing comprises capturing the image by a camera having a wide field of view.

In yet another aspect, the present disclosure provides a method, wherein the captured image is a Ground Truth (GT) image marked using a Bounding Box annotation tool.

In another aspect, the present disclosure provides a method, wherein the deep fully convolutional neural network comprises of a training and inference phase.

In yet another aspect, the present disclosure provides a method, further comprising reshaping the captured images into a predetermined compatible size, while still maintaining the aspect ratio of the objects present in the image which in turn is fed to the deep fully convolution neural network.

In another aspect, the present disclosure provides a method, wherein each branch of the deep fully convolutional neural network comprises a different receptive field corresponding to the size of the object.

In yet another aspect, the present disclosure provides a method, wherein the step of classifying includes routing the object having a smaller size early off for the prediction in the deep fully convolution neural network.

In another aspect, the present disclosure provides a method, wherein the deep fully convolution neural network comprises advanced down sampling and down sampling-convolution-receptive block (DCR) techniques.

In yet another aspect, the present disclosure provides a method, wherein advanced down sampling technique further comprises: down sampling a feature map, wherein a feature map is extracted from an image from a plurality of feature vectors, to record the most activated features of the image; and simultaneously down sampling the same feature map to maintain a localization information.

In another aspect, the present invention provides a method, wherein detecting object includes pedestrian detection.

In further aspect, the present disclosure provides a method, wherein detecting the pedestrian includes detection of pedestrians which are partially visible, occluded or in a clutter.

In yet another aspect, the present disclosure provides a method, wherein predicting objects present in the image comprises: comparing a confidence score associated with each of intermediary prediction objects to the predetermined confidence threshold; and choosing predicted objects having the score above or equal to the predetermined confidence threshold.

In another aspect, the present disclosure provides a method, wherein marking the predicted objects present in the image comprises marking the predicted object with a bounding box.

In further aspect, the present disclosure provides a method, further comprising minimizing loss from the captured image, wherein minimizing the loss comprises back-propagating errors of the image in a training phase.

In yet another aspect, the present disclosure provides a method, further comprising obtaining an output image from the different branches of identification.

In another aspect, the present disclosure provides a method, wherein obtaining an output image comprising concatenating the predicted objects of different sizes before marking the predicted objects in the image.

In further aspect, the present disclosure provides a method, further comprising plotting the marked image onto a display.

In an aspect, the present disclosure provides a system for real-time object detection for a host vehicle, comprising: an image sensor configured to capture an image in the vicinity of the vehicle; a memory configured to stores pre-learned values and captured image data; and a controller configured to: capture an image in vicinity of a vehicle; feeding the captured image to a deep fully convolution neural network; extract one or more relevant features from the captured image; classify the extracted features using one or more branches to identify different size of objects; predict objects present in the image based on a predetermined confidence threshold; and mark the predicted objects in the image; and plot the marked image on a display.

In another aspect, the present disclosure provides a system, wherein the image capturing device comprises one or more image sensors mounted on a vehicle.

In yet another aspect, the present disclosure provides a system, wherein the image capturing device further comprises one or more fish-eye camera mounted on a vehicle.

In further aspect, the present disclosure provides a system, wherein the controller is configured to reshape the captured images into a predetermined compatible size while still maintaining the aspect ratio of the objects present in the image to be fed to the deep fully convolution neural network.

In another aspect, the present disclosure provides a system, wherein each branch of the deep fully convolutional neural network comprises a different receptive field corresponding to the size of the object.

In yet another aspect, the present disclosure provides a system, wherein the controller is configured to route the object having a smaller size early off, for the prediction in the deep fully convolution neural network.

In further aspect, the present disclosure provides a system, wherein the deep fully convolution neural network comprises advanced down sampling and down sampling-convolution-receptive block (DCR) techniques.

In another aspect, the present disclosure provides a system, wherein advanced down sampling technique further comprises: down sampling a feature map, wherein a feature map is extracted from an image from a plurality of feature vectors, to record the most activated features of the image; and simultaneously down sampling the same feature map to maintain a localization information.

In yet another aspect, the present disclosure provides a system, wherein object detection includes pedestrian detection.

In further aspect, the present disclosure provides a system, wherein predicting objects comprises comparing a confidence score associated with each of intermediary prediction objects to the predetermined confidence threshold; and choosing predicted objects having the score above or equal to the predetermined confidence threshold.

In another aspect, the present disclosure provides a system, wherein marking the predicted objects comprises marking the predicted object with a bounding box.

In further aspect, the present disclosure provides a system, wherein the controller is configured to obtain an output image that identifies the object in the image from the different branches of identification.

In another aspect, the present disclosure provides a system, further comprising obtaining an output image comprises concatenating the predicted objects of different sizes before marking the predicted objects in the image.

In yet another aspect, the present disclosure provides a system, further comprising plotting the marked image onto a display.

In yet another aspect, the present disclosure provides a vehicle including the system of as described in above paragraphs.

In an aspect, the present disclosure provides a system for object real-time detection, comprises: means for capturing an image in the vicinity of the vehicle; means for feeding the captured image to a deep fully convolution neural network; means for extracting one or more relevant features from the captured image; means for classifying the extracted features using one or more branches to identify different size of objects; means for predicting objects present in the image based on a predetermined confidence threshold; and means for marking the predicted objects in the image.

In another aspect, the present disclosure provides a system, wherein the means for capturing an image comprises capturing the image by a camera having a large field of view.

In yet another aspect, the present disclosure provides a system, wherein the means for capturing an image comprises means for reshaping captured images into a predetermined compatible size while still maintaining the aspect ratio of the objects present in the image which in turn to be fed to the deep fully convolution neural network.

In further aspect, the present disclosure provides a system, wherein each branch of the deep fully convolutional neural network comprises a different receptive field corresponding to the size of the object.

In another aspect, the present disclosure provides a system, wherein the means of classifying further comprises means for routing the object having a smaller size early off for the prediction in the deep fully convolution neural network.

In yet another aspect, the present disclosure provides a system, which further comprises means for resizing an output image from the different branches of identification.

In further aspect, the present disclosure provides a system, wherein the deep fully convolution neural network comprises advanced down sampling and down sampling-convolution-receptive block (DCR) techniques.

In another aspect, the present disclosure provides a system, wherein advanced down sampling technique further comprises: down sampling a feature map, wherein a feature map is extracted from an image from a plurality of feature vectors, to record the most activated features of the image; and simultaneously down sampling the same feature map to maintain a localization information.

In yet another aspect, the present disclosure provides a system, wherein object detection includes pedestrian detection.

In further aspect, the present disclosure provides a system, wherein the pedestrian detection includes detection of pedestrians which are partially visible, occluded or in a clutter.

In another aspect, the present disclosure provides a system, wherein the means for predicting objects further comprises: means for comparing a confidence score associated with each of intermediary prediction objects to the predetermined confidence threshold; and means for choosing predicted objects having the score above or equal to the predetermined confidence threshold.

In yet another aspect, the present disclosure provides a system, wherein the means for marking the predicted objects in the image further comprises means for marking the predicted object with a bounding box.

In another aspect, the present disclosure provides a system, which further comprises means for obtaining an output image that identifies the object in the image from the different branches of identification.

In yet another aspect, the present disclosure provides a system, wherein means for obtaining an output image further comprises means for concatenating the predicted objects of different sizes before marking the predicted objects in the image.

In another aspect, the present disclosure provides a system, which further comprises means for plotting the marked image onto a display.

In an aspect, the present disclosure provides a non-transitory computer-readable medium. The computer readable medium comprising computer-readable instructions for object detection for a host vehicle, when executed by a processor, causes the processor to: capture an image outside/in the vicinity of the host vehicle; feeding the captured image to a deep fully convolution neural network; extract one or more relevant features from the captured image; classify the extracted features into one or more branches to identify different size of objects; predict objects present in the image based on a predetermined confidence threshold; mark the predicted objects in the image; and plot the marked image on a display.

In another aspect, the present disclosure provides a computer-readable medium, further comprising instructions that cause the processor to reshape the captured images into a predetermined compatible size while still maintaining the aspect ratio of the objects present in the image to be fed to the deep fully convolution neural network.

In yet another aspect, the present disclosure provides a computer-readable medium, wherein each branch of the deep fully convolutional neural comprises a different receptive field corresponding to the size of the object.

In further aspect, the present disclosure provides a computer-readable medium, further comprising instructions that cause the processor to route the object having a smaller size early off, for the prediction in the deep fully convolution neural network.

In another aspect, the present disclosure provides a computer-readable medium, wherein the deep fully convolution neural network comprises advanced down sampling and down sampling-convolution-receptive block (DCR) techniques.

In yet another aspect, the present disclosure provides a computer-readable medium, wherein advanced down sampling technique further comprises: down sampling a feature map, wherein a feature map is extracted from an image from a plurality of feature vectors, to record the most activated features of the image; and simultaneously down sampling the same feature map to maintain a localization information.

In another aspect, the present disclosure provides a computer-readable medium, wherein the pedestrian detection includes detection of pedestrians which are partially visible, occluded or in a clutter.

In yet another aspect, the present disclosure provides a computer-readable medium, wherein predicting objects comprises: comparing a confidence score associated with each of intermediary prediction objects to the predetermined confidence threshold; and choosing predicted objects having the score above or equal to the predetermined confidence threshold.

In further aspect, the present disclosure provides a computer-readable medium, wherein further comprising instructions that cause the processor to mark the predicted object with a bounding box.

In yet another aspect, the present disclosure provides a computer-readable medium, further comprising instructions that cause the processor to obtain an output image from the different branches of identification pertaining to different scales.

In further aspect, the present disclosure provides a computer-readable medium, further comprising instructions that cause the processor to concatenate the predicted objects of different sizes before marking the predicted objects in the image.

In another aspect, the present disclosure provides a computer-readable medium, further comprising instructions that cause the processor to plot the marked image onto a display.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIGS. 10a and 10b illustrates input reinforcement module and feature pooling module respectively of the model architecture according to an aspect of the present disclosure.

DETAILED DESCRIPTION

Figure 1:
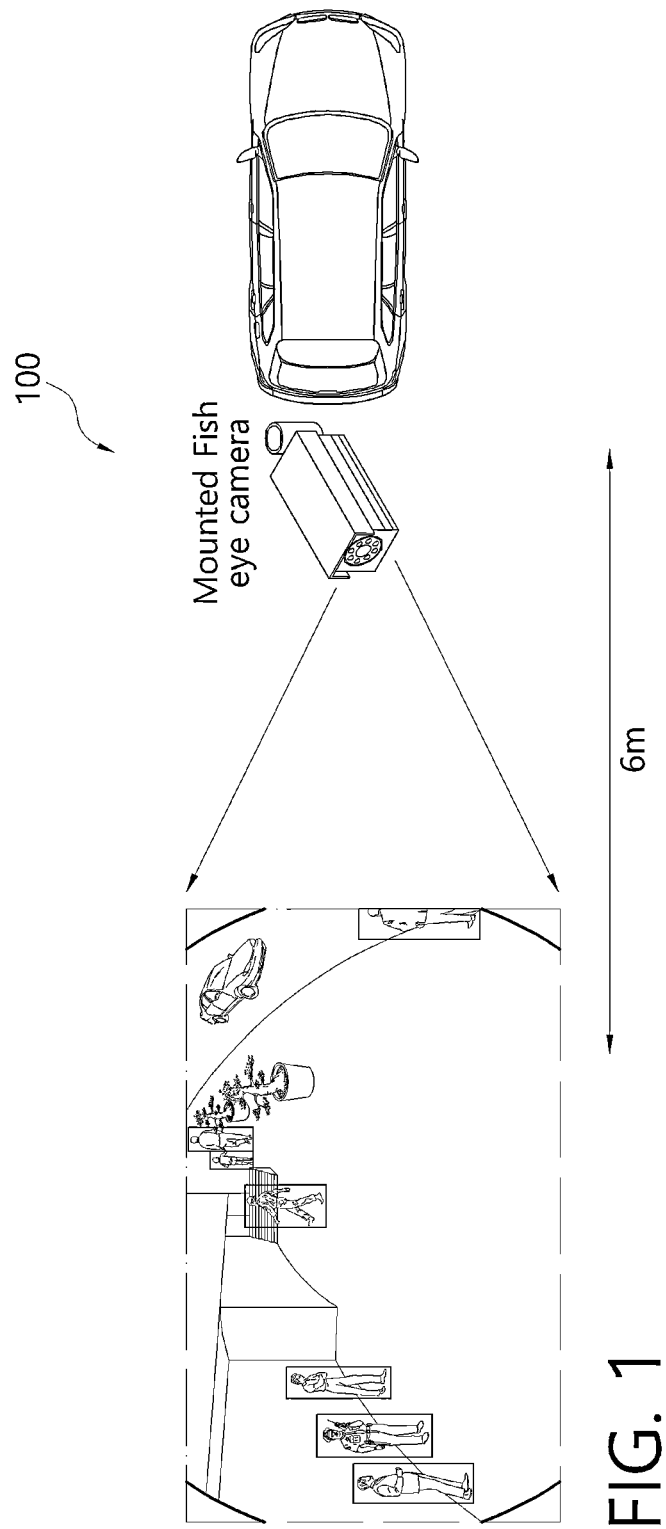
FIG. 1 illustrates an exemplary system to demonstrate object detection according to an aspect of the present disclosure.

Referring in the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device that comprises a list of components does not include only those components but may include other components not expressly listed or inherent to such setup or device. In other words, one or more elements in a system or apparatus proceeded by "comprises . . . a" does not, without more constraints, preclude the existence of other elements or additional elements in the system or apparatus or device. It could be noted with respect to the present disclosure that the terms like "a system for real-time object detection", "the system" are interchangeably used throughout the description and refer to the same system. Similarly, terms like "Autonomous Driving Vehicles", "autonomous vehicles", are interchangeably used throughout the description.

Disclosed herein are the techniques for real-time object detection. In an exemplary embodiment of the present disclosure, an image capturing device is mounted on a vehicle, either at back or front or at both places or in any other location for the vehicle as it deems fit. As an example, the image capturing device may include, but not limited to a fisheye camera which provides a wider Field of View (FOV). The fish-eye camera continuously captures an image and sends these images for further processing. For example, the images captured by the camera is provided to real-time object detection system. The system extracts required features from the image, classifies extracted features using one or more branches of a deep fully convolution neural network to identify different size of objects, marks the predicted objects in the image and obtain an output image marked with a bounding box.

This achieves advantages with respect to accuracy and speed and contributes to efficient and robust real time object detection. Also, the present system is board friendly and port ready. It is light-weight and runs at more than real time speed (30FPS) making it suitable for deployment into embedded board. The present disclosure achieves these advantage(s) in a manner as described below with respect to the drawings.

FIG. 1 illustrates an exemplary system 100 to demonstrate object detection in autonomous vehicles using fish-eye camera according to an aspect of the present disclosure. As already indicated in the background section, the conventional camera has a higher Field of View (FOV) i.e., ~6-100 meters restricting it to perceive ~6 meters directly ahead of the vehicle which is crucial for any object detection system. The area not perceivable by conventional cameras is known as the blind spot. Fisheye camera is able to avoid this problem as it can perceive the area in the blind spot making it favorable for real time object detection systems. Fisheye camera can be used in both cases where lower FOV is required and also where higher FOV is required that eliminates the use of multiple cameras for different cases. Although, fish-eye camera is preferable for image capturing in the present disclosure, however, it may be noted that any other such camera that fulfills desired requirement of the present disclosure may be used for image capturing.

Figure 2:
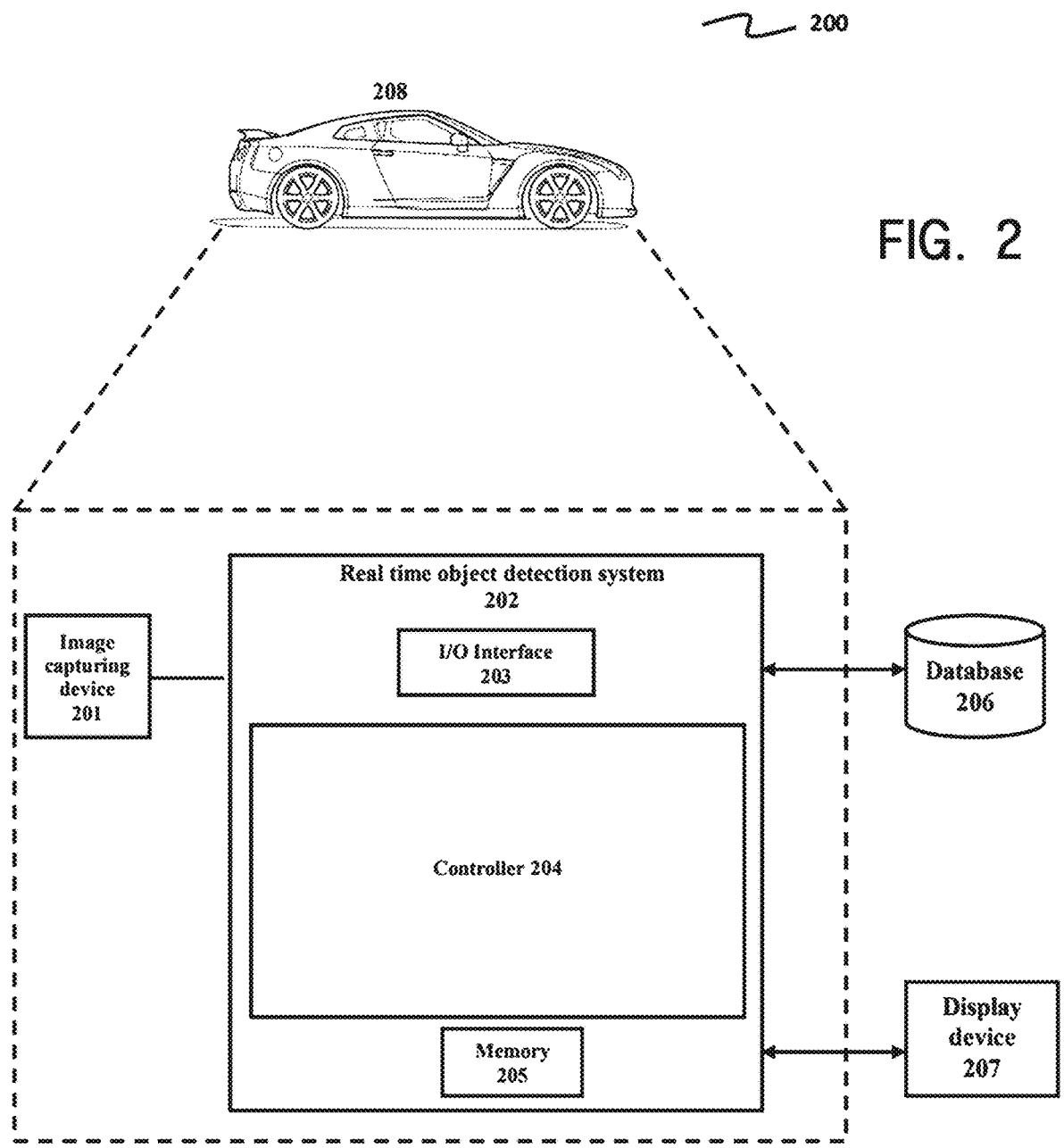
FIG. 2 illustrates an exemplary system for real-time object detection in accordance with an aspect of the present disclosure.

FIG. 2 illustrates an exemplary system for real-time object detection in accordance with an aspect of the present disclosure.

The present disclosure provides a computationally efficient and optimized design for detecting different objects using a fish-eye camera in vehicles. The fish-eye camera captures images with a length of view up to 6 meters. The present disclosure makes the prediction of bounding boxes in one go, rather than first proposing the regions of the image where the objects might be present, and then running a box regression model to fine-tune and get the bounding boxes on the predicted objected, which needs a lot of computation and thus avoids post processing. This makes the whole system computationally efficient with an optimized design.

The present disclosure uses Deep Learning based approach that makes the inference faster with respect to other conventional computer vision approaches. The whole process is end-to-end and thus provides results in real time.

The architecture 200 comprises a vehicle 208, a real time object detection system 202 and a display device 207. As an example, the vehicle 208 may be a car, a truck, a bus, and the like. Input images captured by an image capturing device 201 is mounted on the vehicle 208 and provided to the real time object detection system 202. As an example, the image capturing device 201 may be mounted on the vehicle 208, an image repository or a computing device such as a mobile, a desktop, a laptop and the like associated with the image capturing device. As an example, the image capturing devices may include, but not limited to, a camera. In some embodiments, one or more image capturing devices may be configured at different positions on the vehicle 208. The preferred position is at the rear bumper of the vehicle. The real time object detection system 202 may be hosted on a server. In some embodiments, the server in which the real time object detection system 202 is hosted may be a local server configured in the vehicle 208 as shown in the FIG. 2. In some other embodiments, the server in which the real time object detection system 202 is hosted may be a remote server or a cloud server.

Further, the real time object detection system 202 may include a Controller 204, an Input/output (I/O) interface 203 and a memory 205. The I/O interface 203 may receive an input image/training image from a data source among the one or more data sources. In some embodiments, the input image may be captured by the image capturing device 201 configured to capture surround view from the vehicle 208. In some embodiments, the training image may be a Ground Truth (GT) image comprising one or more objects. The input image received through the I/O interface 203 may be stored in the memory 205. Further, the I/O interface 203 may access historical object data stored in the database 206 associated with real time object detection system 202. As an example, the historical object data may include, but not limited to, different types of objects detected from previous images captured in real-time by the image capturing device. In some embodiments, the database 206 may further include, but not limited to, training images of the objects captured in different weather conditions and light conditions, and other related image parameters. Further, Controller 204 may extract all of the features or feature maps from the input image. These feature maps are flattened to form a feature vector. The Controller 204 extracts all the highly activated features from the extracted features.

The Controller 204 further detects an object by classifying the extracted features using one or more branches to identify different size of objects, predicting objects present in the image based on a predetermined confidence threshold and marking the predicted objects in the image. The Controller 204 classifies the different size of objects by routing the object having a smaller size early off for the prediction in the deep fully convolution neural network.

It may be worth noted from above that the object detection is performed by the Controller 204 based on the historical object data, using a trained machine learning model.

As an example, the trained machine learning model may detect the object in the input image under various conditions such as noisy conditions occurring due to presence of dust/water on the image capturing device, due to rain and the like, varying illumination conditions due to shadows of surrounding objects, weather conditions and the like. Also, the trained machine learning model may detect objects, e.g. the pedestrian which are partially visible, occluded or in a clutter. Further, in some embodiments, the detected objects are marked and displayed using the display device 207 associated with the system 202.

Figure 3:
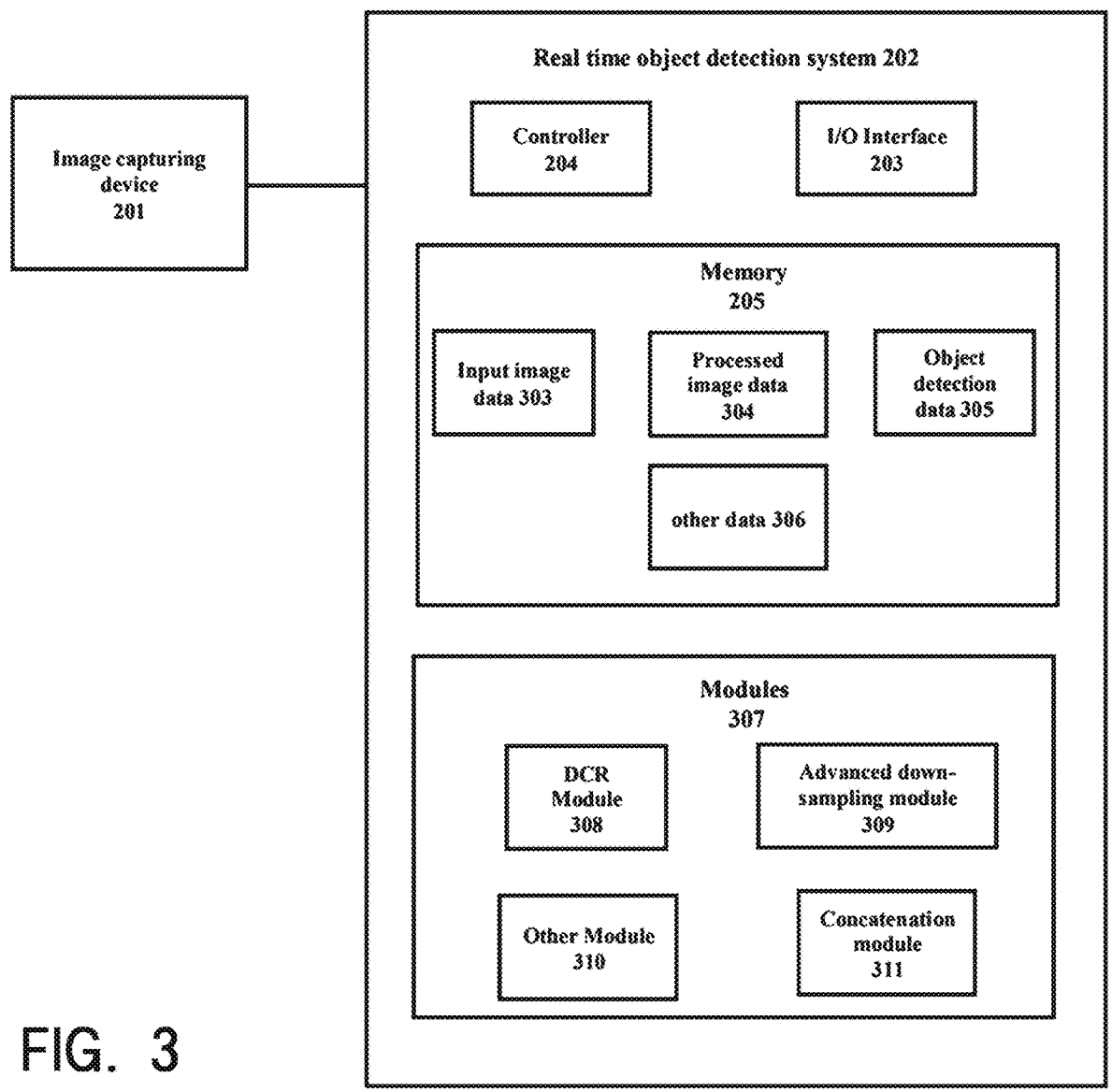
FIG. 3 illustrates detailed block diagram for the real-time object detection system in accordance with an aspect of the present disclosure.

FIG. 3 illustrates a detailed block diagram for the real-time object detection system in accordance with an aspect of the present disclosure.

In some implementations, the real time object detection system 202 may include data and modules 307. As an example, the data may be stored in a memory 205 configured in the real time object detection system 202. In one embodiment, the data may include input image data 303, processed image data 304, object detection data 305 and other data 306.

In some embodiments, the data may be stored in the memory 205 in form of various data structures. Additionally, the data can be organized using data models, such as relational or hierarchical data models. The other data 306 may store data, including temporary data and temporary files, generated by the modules 307 for performing the various functions of the real time object detection.

In some embodiments, the data stored in the memory may be processed by the modules 307 of the real time object detection system 202. The modules 307 may be stored within the memory 205. In an example, the modules 307 communicatively coupled to the Controller 204 configured in the real time object detection system 300, may also be present outside the memory 304 as shown in FIG. 3 and implemented as hardware. As used herein, the term modules 307 may refer to an application specific integrated circuit (ASIC), an electronic circuit, a processor (shared, dedicated, or group), a controller and memory that execute one or more software or firmware programs, a combinational logic circuit, and/or other suitable components that provide the described functionality.

In some embodiments, the modules 307 may include, for example, a DCR module 308, an advanced down sampling module 309, concatenation module 311 and other modules 310. The other modules 310 may be used to perform various miscellaneous functionalities of the real time object detection system 202. It will be appreciated that such aforementioned modules 307 may be represented as a single module or a combination of different modules.

In some embodiments, the advanced down sampling module 309 may receive an input image from image capturing device. The input image thus received may be stored as the input image data 303.

In some embodiments, the input images captured by an image capturing device configured on the vehicle 208 are provided to the real time object detection system 202. As an example, input images may be provided by, for example, the image capturing device configured on the vehicle 208.

As previously discussed, in some embodiments, the training/input image is a Ground Truth (GT) image comprising one or more objects. The GT image may be generated from an input image captured by the image capturing device using available bounding box (BB) marking tool. In particular, all the captured images are marked with BB marking tool, which outputs 4 coordinates for every marked pedestrian (Top left and bottom right coordinated of the bounding boxes). These marked images are used as ground truth labels which are used to train the deep learning model/network to predict pedestrians on unseen data. In some embodiments, the input image may be an RGB image that may include scene covered in the FOV of the image capturing device 201 configured to capture surround view from the rear end of the vehicle 208. The different modules/units are now described in detail in FIGS. 4-18.

Figure 4:
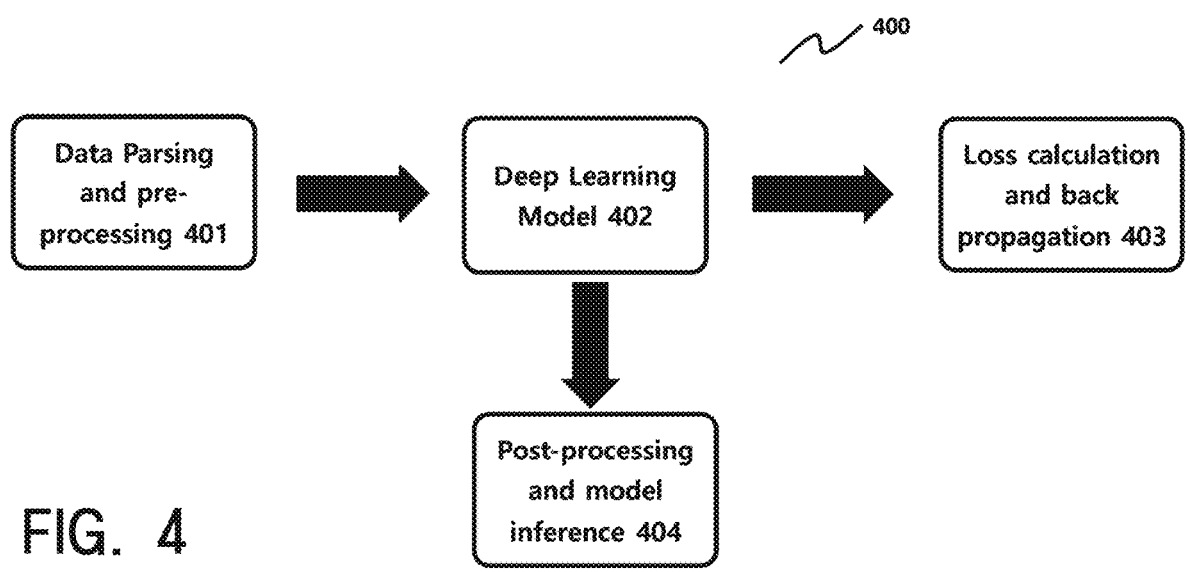
FIG. 4 illustrates a multi-step process to achieve real-time object detection according to an aspect of the present disclosure.

FIG. 4 illustrates a complete multi-step process 400 to achieve real-time object detection according to an embodiment of the present disclosure. The various steps involved are namely, data parsing and preprocessing 401, a deep learning model 402, loss calculation and back propagation 403 and post-processing and model inference 404. Post processing is used to retrieve meaningful boxes for an image from the output produced by the deep learning model. The process of preferred post processing is described in detail in FIG. 18

In an exemplified embodiment of the present disclosure, the dataset preparation is done using the fisheye camera lens installed on the vehicle. After capturing the images, data is parsed and preprocessed 401. Preprocessing is done on the captured raw data before it is fed to the machine learning or deep learning model. The process of preferred pre processing is described in detail in FIG. 17. After the preprocessed data is fed to the model, loss calculation is performed in which errors of the image are back propagated in the training phase. The object detection is performed by the model using different branches to identify different sized objects. The different objects are predicted and marked onto the image using a BB marking tool. The final marked image is obtained in the post processing and inference stage.

In one of the exemplary embodiments, the model can take an image input of any size which is preferably internally reshaped into a 608×608×3 image, which is then fed to the model for making predictions. All the images during the training phase are augmented for a more generalized model. The data augmentation process in incorporated into the training pipeline itself. Leaky ReLU non-linearity, and batch normalization is used throughout the model after every convolution layer.

In one of the exemplary embodiments, the present disclosure uses exponential moving average for preventing the problem of over fitting. The exponential moving average of the weights during training are calculated, which prevents over fitting. These calculated averages are then used for making predictions.

The present model/architecture can be used for object detection without any pre-training of feature extractor on huge datasets (e. g. ImageNet), as is required by all state-of-the-art architectures for achieving good results. Although, the present model is described with reference to pedestrian detection, it can be generalized to be a generic object detector.

In an exemplary embodiment, the whole model architecture has been divided into two modules, namely, advanced down sampling block, and DCR block (Down sampling-convolution-receptive block). All modules/submodules/units and techniques used throughout the model architecture make use of depth-wise separable convolution in order to save computation time and decrease model size. Every module/unit will be explained henceforth in the FIGS. 5-10.

Figure 5:
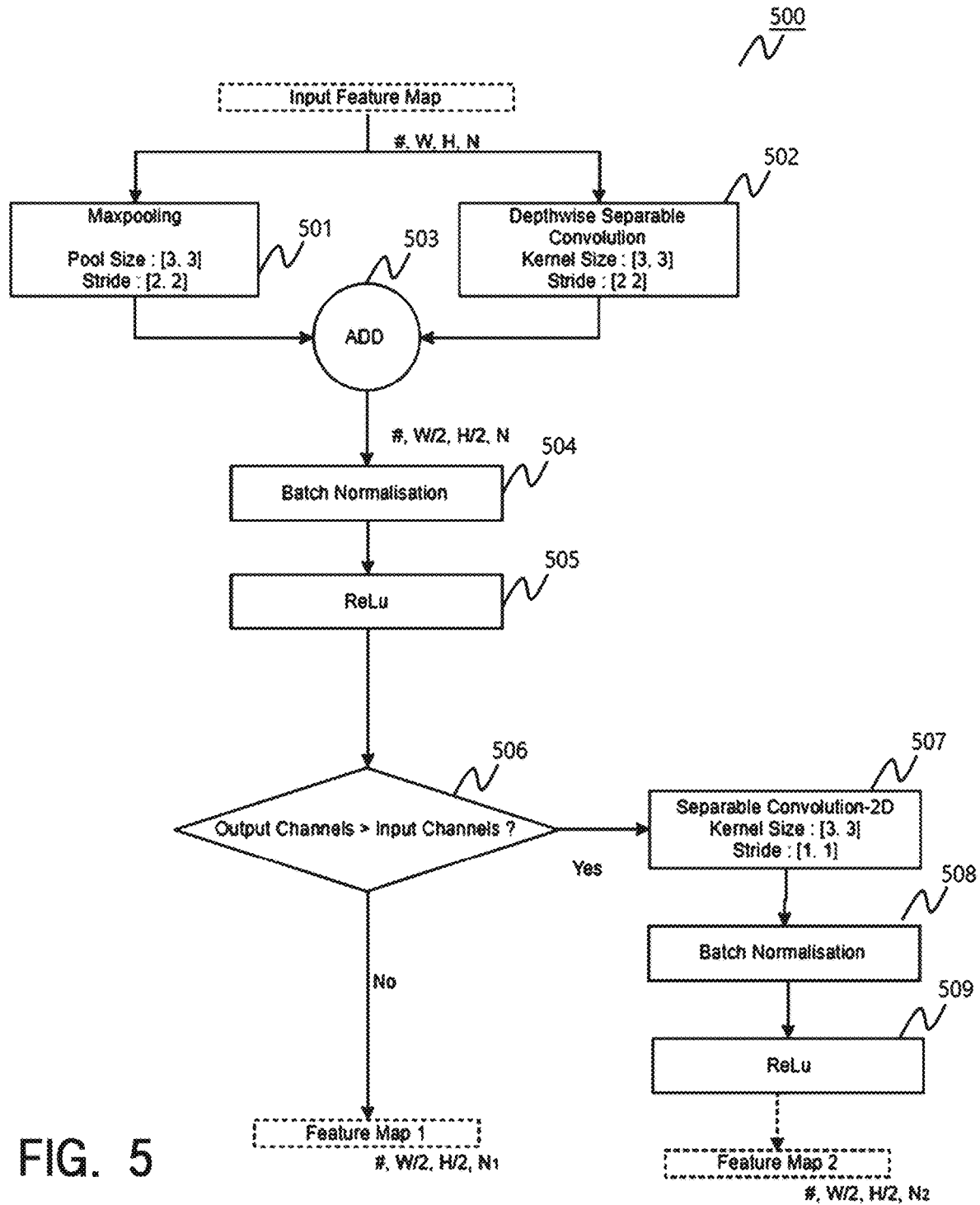
FIG. 5 illustrates a block diagram of advanced down sampling block of the model architecture according to an aspect of the present disclosure.

FIG. 5 illustrates a block diagram of advanced down sampling block of the model architecture according to an aspect of the present disclosure.

Advanced down sampling module is used for down sampling the feature maps throughout the model which is explained in greater details in the following paragraphs. Two basic methods are generally used for down sampling images, one makes use of pooling layers and other makes use of 2-stride convolutions. When the max-pool layer is used for down sampling a feature map, it extracts only those values from the feature map that have highest activations, but on doing so, localisation information is lost.

When a 2-stride convolution is used for down sampling over a feature map, it maintains the localisation formation, but doesn't take into account the areas of the feature maps which are highly activated.

In an exemplary embodiment of the present disclosure, a down sampling module 500 is provided, in which first the input feature maps are down sampled using max-pool layer 501, which records all the highly activated features. Simultaneously, a 2-stride convolution 502 is used to down sample the same feature map, maintaining the localisation information. Then an addition is done between both the down sampled feature map to get the final result 503, 504, 505.

The advanced down sampling module 500 down samples the feature map by a factor of 2 along the width and the height dimensions but the channels axis remains unaffected. In one of the exemplary embodiment of the present disclosure, if the required channels of the output feature map are greater than the channels of the input feature map 506, the down-sampled feature map is followed by another convolution 507, 508, 509 which increases the number of the channels of the feature maps. Using the combination of max-pool 501 and 2-stride convolution 502 instead of just the 2-stride convolution resulted in a reduction of 1.17% on the False Positives, whereas the Recognition Rate increased by 4.16%.

Figure 6:
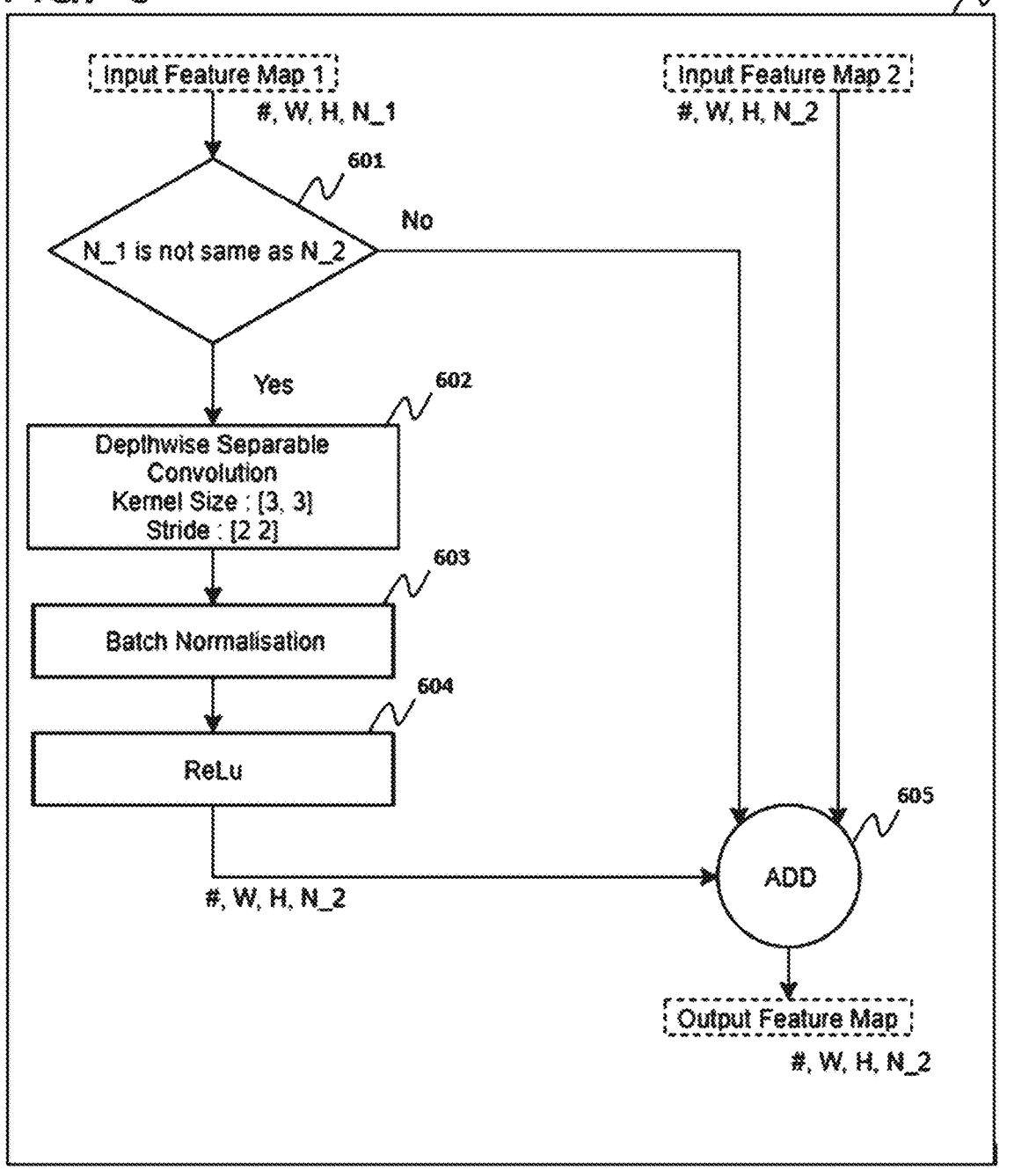
FIG. 6 illustrates a block diagram of residual block of the model architecture according to an aspect of the present disclosure.

FIG. 6 illustrates a block diagram of residual block of the model architecture according to an aspect of the present disclosure.

In one of the exemplary embodiments of the present invention, residual block 600 is used to avoid overfitting and help the model become more generalisable. There are two feature map inputs to this block. If the depth of one feature map 'N_1' is not same as the depth of another feature map 'N_2' 601, a depth wise convolution 602, 603, 604 is applied to the first feature map, to make the depth channels consistent. After this operation, input feature map 1 and input feature map 2 are added using the 'Add' operation 605. It improves the feature representation by adding lower level features to higher level features. It also stops flow of exploding and vanishing gradients during the backward propagation.

Figure 7:
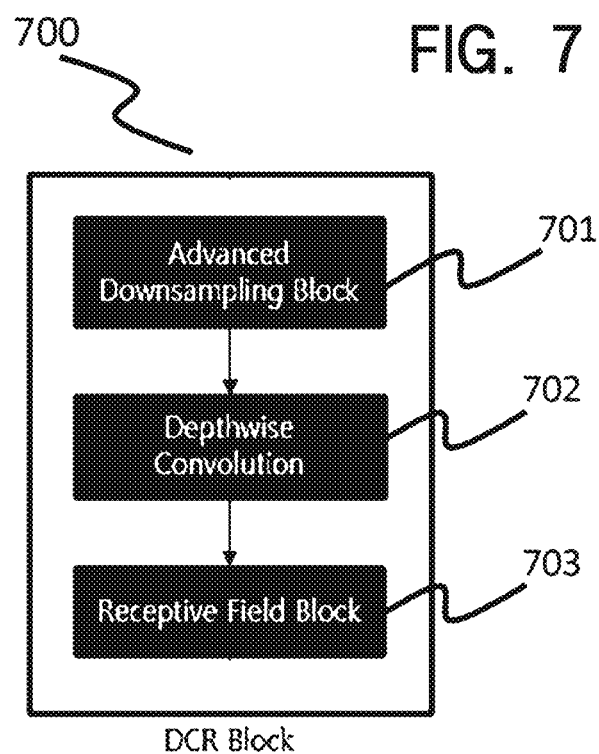
FIG. 7 illustrates an overview of a down sampling-convolution-receptive block (DCR) block of model architecture according to an aspect of the present disclosure.

FIG. 7 illustrates an overview of a down sampling-convolution-receptive block (DCR) block of model architecture according to an aspect of the present disclosure.

DCR Block 700 is a combination of Down sampling 701, Convolution 702 and Receptive field block 703. The down sampling block is the advanced down sampling module, and, as explained earlier, is used to down-sample the feature maps. Each of these blocks are explained in further paragraphs.

The receptive field (RF) module/block 703 is the most computationally expensive module of the model architecture. In order to reduce the computation a convolution is used to decrease the number of channels of the input feature map, before passing it on to the receptive field (RF module). The convolution used is a depth wise separable convolution. RF module is used to increase the receptive field 703 by a great extent by parallel processing of the provided feature map, unlike prior arts where the receptive field is increased linearly, by stacking up several convolution operations.

Figure 8:
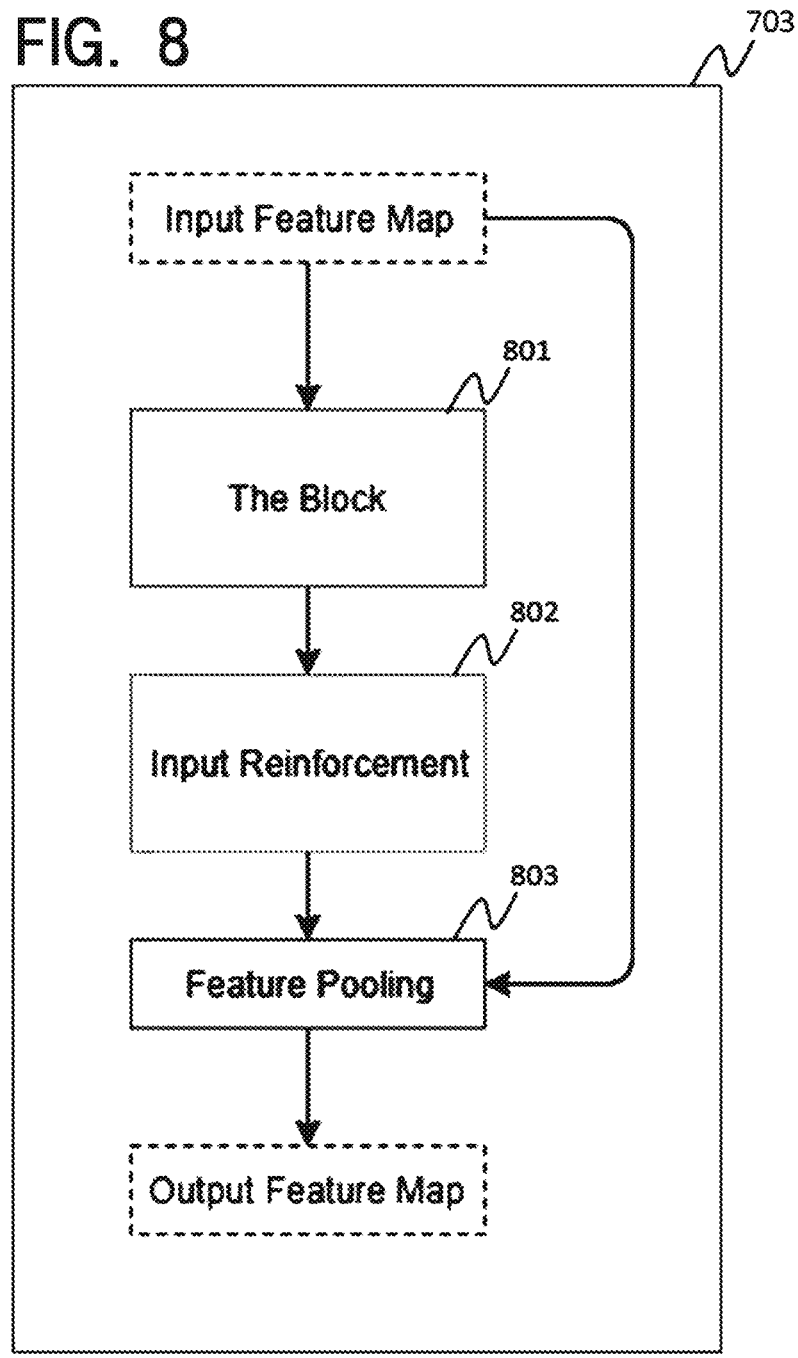
FIG. 8 illustrates a block diagram of receptive field (RF) block/module of the DCR block according to an aspect of the present disclosure.

FIG. 8 illustrates a block diagram of receptive field (RF) block/module of the DCR block according to an aspect of the present disclosure.

The RF module 703 is divided into 3 sub-modules, namely Block 801, Input Reinforcement 802 and Feature Pooling 803. RF module divides the given feature map into multiple branches. These branches are processed in parallel using convolutions of varied convolution kernel sizes, resulting in activations having different receptive fields. This helps is increasing the model non-linearity and receptive field but at the same time is not very computationally expensive because of parallel computation on feature maps.

Input reinforcement 802 is used for improving the feature representations by making use of original image. Feature pooling module 803 helps in increasing the number of features (channels) which aids the feature extraction process. All these submodules are explained in greater details in following drawings.

Figure 9:
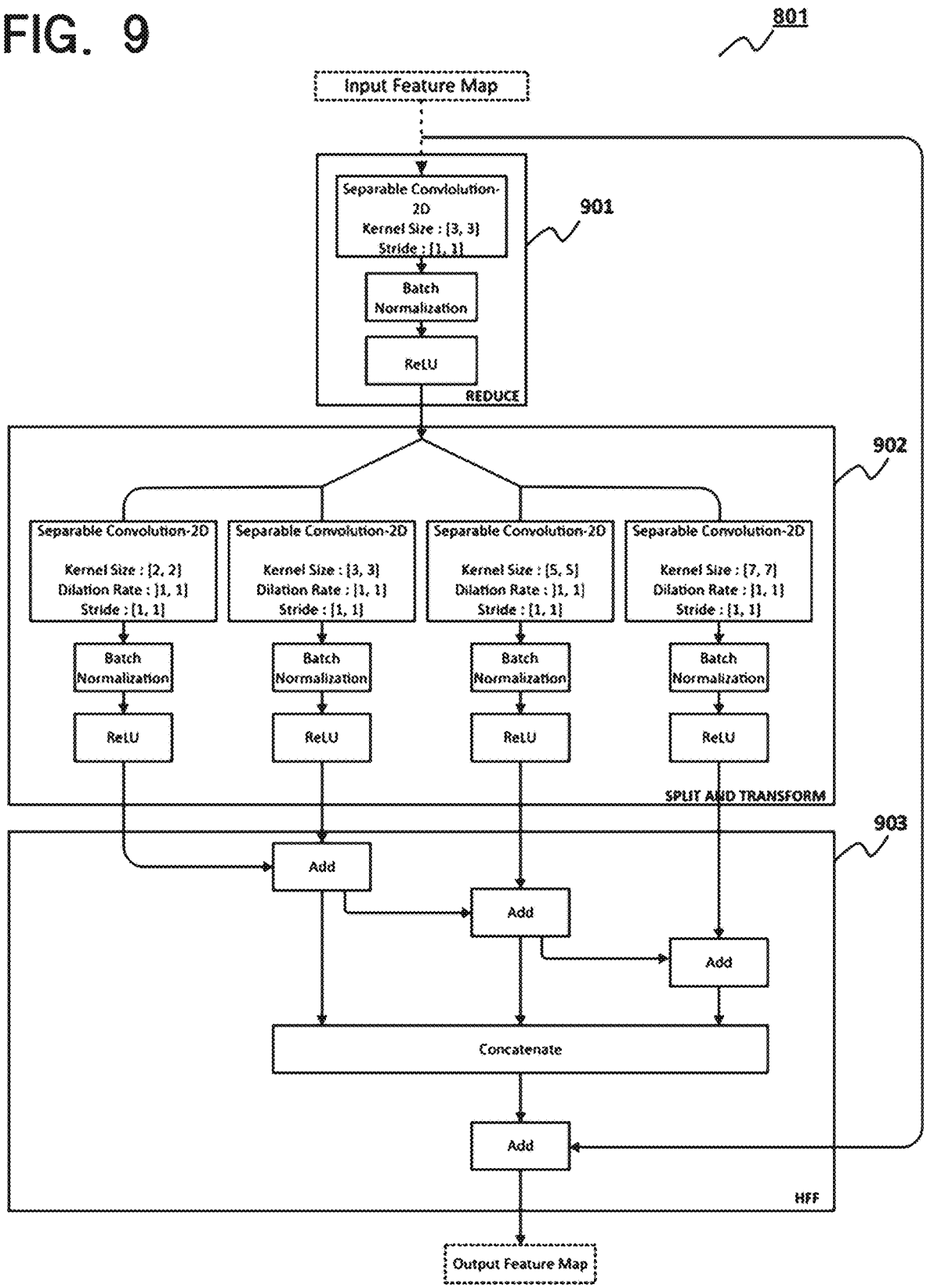
FIG. 9 illustrates a block diagram of block module of receptive field (RF) according to an aspect of the present disclosure.

FIG. 9 illustrates a block diagram of block module of receptive field (RF) according to an aspect of the present disclosure.

In one of the exemplary embodiment of the present disclosure, Block operates by doing parallel convolution operation on "n" number of branches with various convolution kernel sizes, resulting in activations having different receptive fields in order to increase the receptive field of the model, at the same time keeping computational requirements in check. It has 3 modules for doing so namely, reduce module 901, split and transform module 902 and hierarchical feature fusion module (HFF) (903) of receptive field (RF) block/module respective of the DCR block according to an aspect of the present disclosure.

Reduce 901—Reduce module of the block is responsible for splitting the given feature maps having "m" channels in 'n' branches. In order to do so, a depth-wise convolution operation is done on the feature map such that the channels are reduced from "m" to "n".

Split and Transform 902—Split and transform module operates on the output provided by Reduce branch. "n" depth-wise separable convolution operations, with convolution kernels of size {2, 3, 5, 7} are applied in parallel.

Hierarchical Feature Fusion (HFF) 903—In order to compensate for the very large dilation factors used to increase the receptive field in previous module, HFF is used, in which output of each branch is added hierarchically with each other. After addition, all the outputs are concatenated together along the channel axis, so that the shape of the output feature map after applying the Block module is same as the input feature map. After the concatenation operation, another addition operation is carried out between the output of concatenation and the input to Block to get further fine-grained features.

Figure 10B:
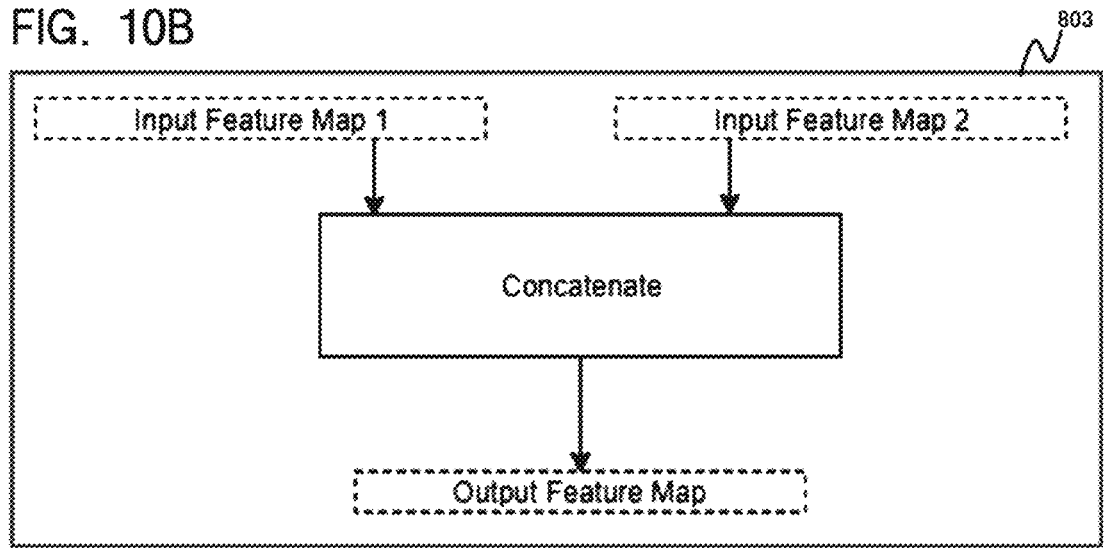

FIGS. 10a and 10b illustrates input reinforcement module and feature pooling module respectively of the model architecture according to an aspect of the present disclosure.

As the deep learning architecture being presented is small, Input Reinforcement 1000a is used at various parts of the network. In this technique, the original input image provided to the model is concatenated to the required feature map long the channels axis. The input image is resized (using nearest neighbor up sampling technique) before concatenation, so that its size matches the feature map it is to be concatenated 1001, 1002, 1003, 1004, 1005.

As previously discussed, Input reinforcement 802 is used for improving the feature representations by making use of original image. Feature pooling module 803 helps in increasing the number of features (channels) which aids the feature extraction process. All these submodules are explained in greater details in following drawings.

In order to increase the number of channels (features), prior deep learning models used to linearly increase the number of channels by using various convolutions with increasing number of filters. In order to achieve the similar accuracy but still keep the computation and model size under considerable numbers for easy deployment on edge devices, the proposed method, concatenates the feature maps along the channels axis to increase the number of channels (features) with negligible computation required and no additional parameters for increasing the number of channels.

Figure 11A:
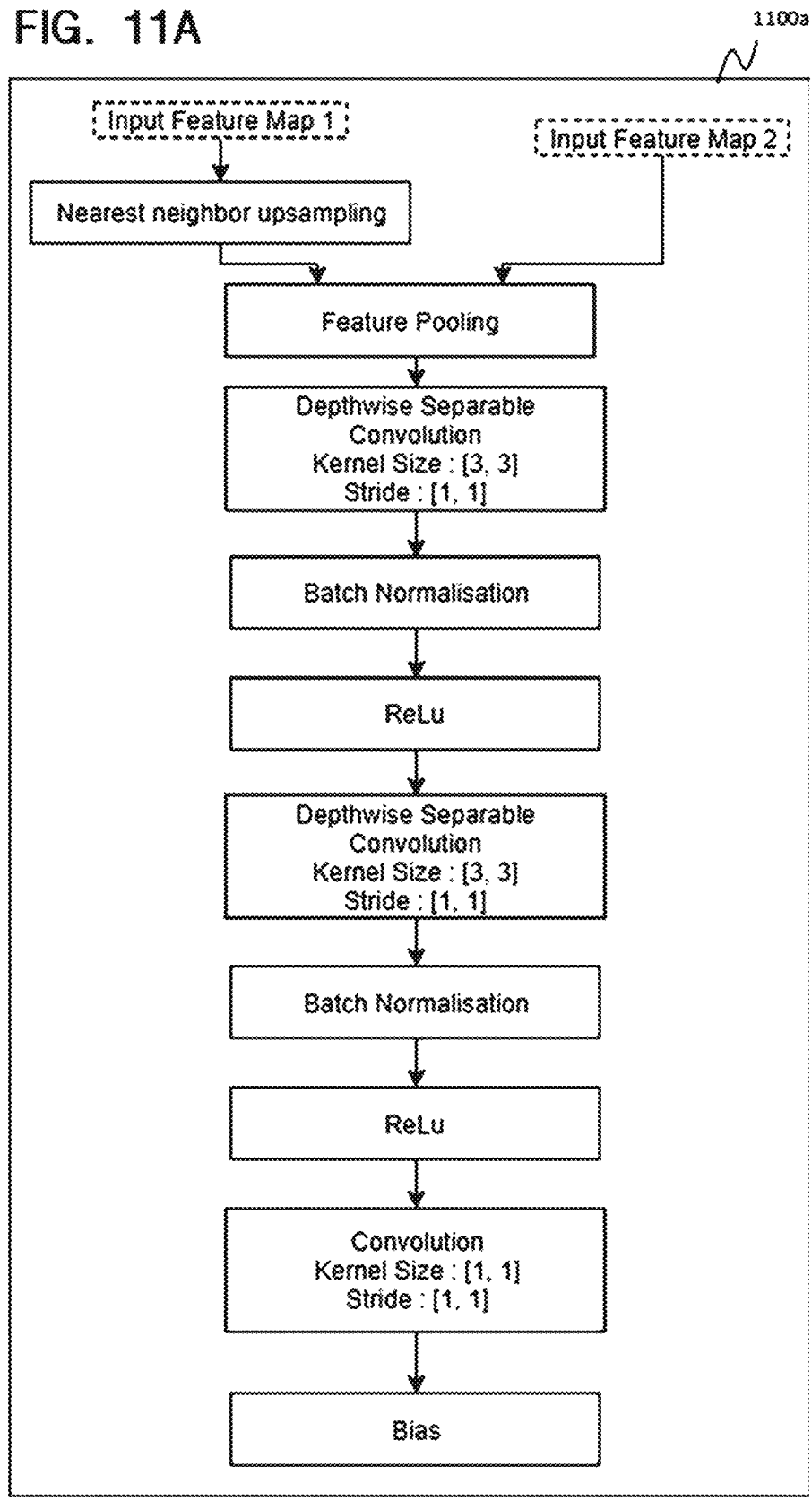
FIGS. 11a, 11b and 11c illustrates block diagrams for making bounding box prediction using three difference branches of a Convolutional Neural Network model according to an aspect of present disclosure.
Figure 11B:
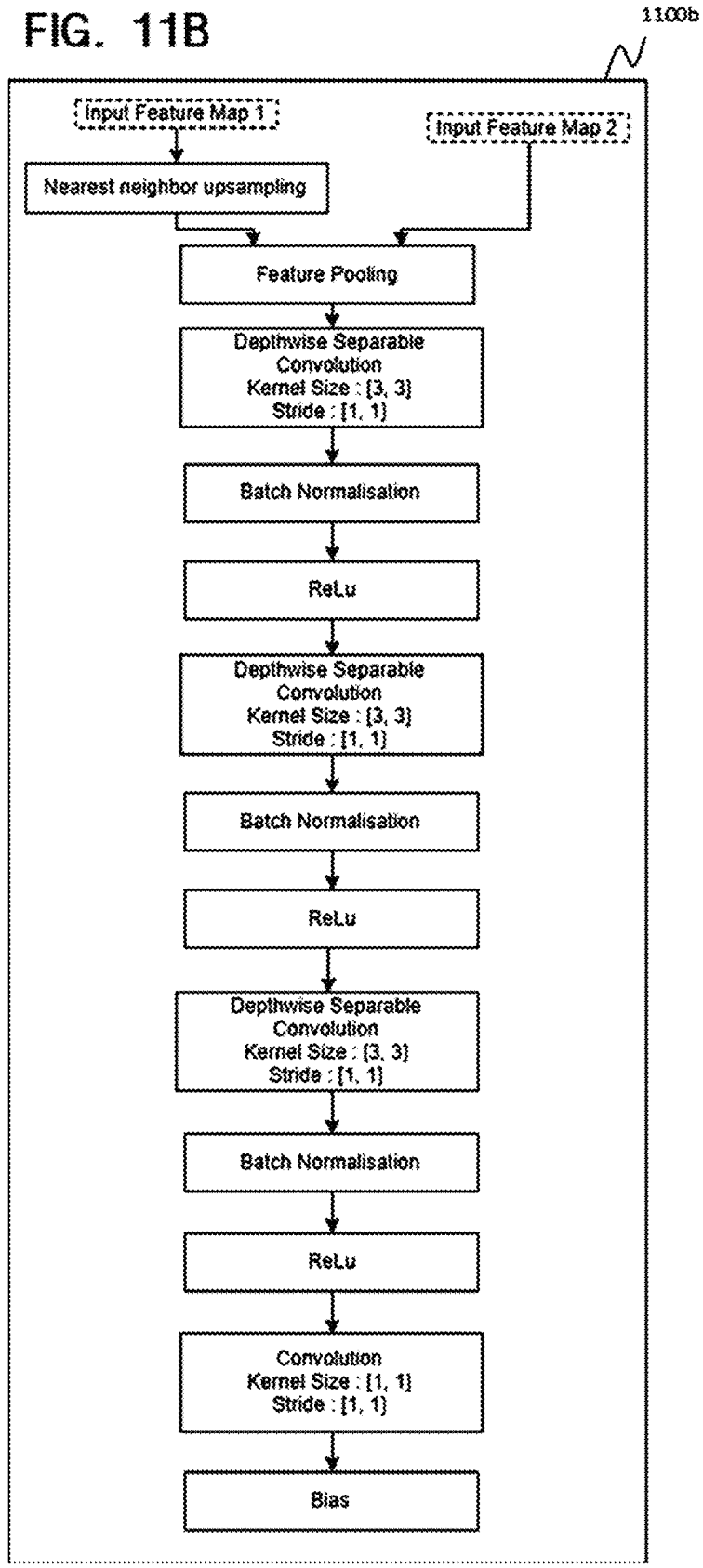
Figure 11C:
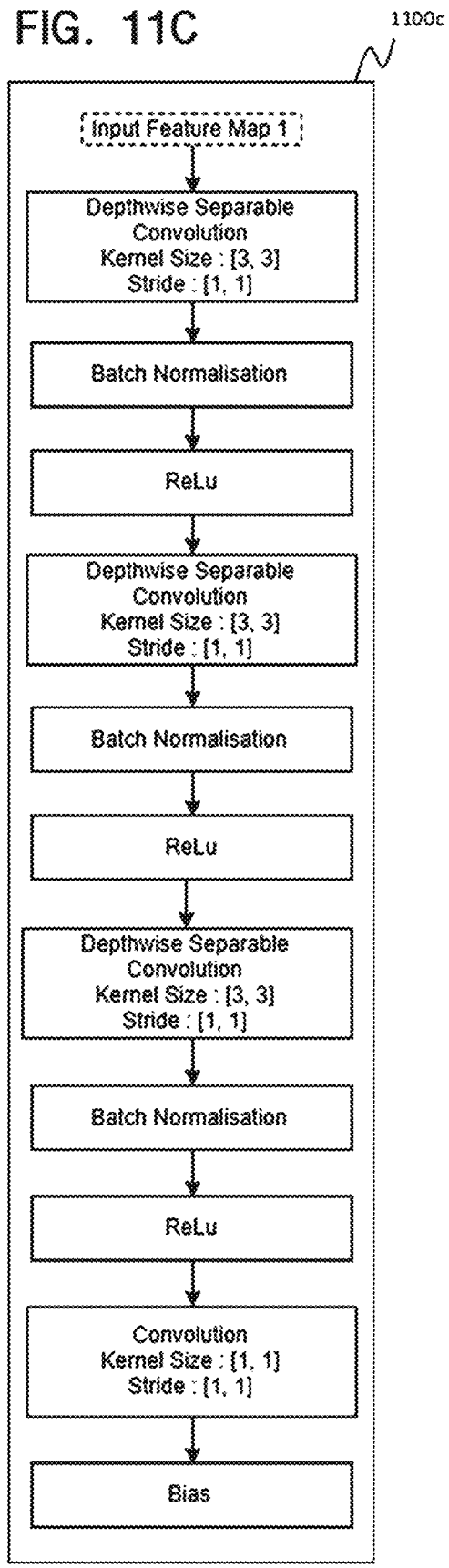

FIGS. 11a, 11b and 11c illustrates block diagrams for making bounding box prediction using three difference branches, namely small object branch, medium object branch and large object branch of a Convolutional Neural Network model.

In one of the preferred embodiments of the present disclosure, the model makes bounding box prediction using three different branches. Each branch is specialized to predict objects of different sizes. To achieve such a behaviour, the proposed model is designed carefully, such that each branch has different receptive field corresponding to the size of the objects they are being trained to predict.

The small object branch 1100a in FIG. 11a requires the smallest receptive field, in order to achieve this, the branch responsible from small object predictions is routed early off in the architecture when the receptive field is still low. But doing so, the branch cannot utilise the features extracted by the further computation. The best of both is achieved by taking output from the branch in which more computation is done, resizing it, and concatenating it with the required output branch. A few more convolutions are applied after the concatenation to get the final output.

The same procedure is followed by medium object branch 1100b in FIG. 11b as well. The large object branch 1100c in FIG. 11c requires the largest receptive field hence it does not follow the above procedure.

Figure 12:
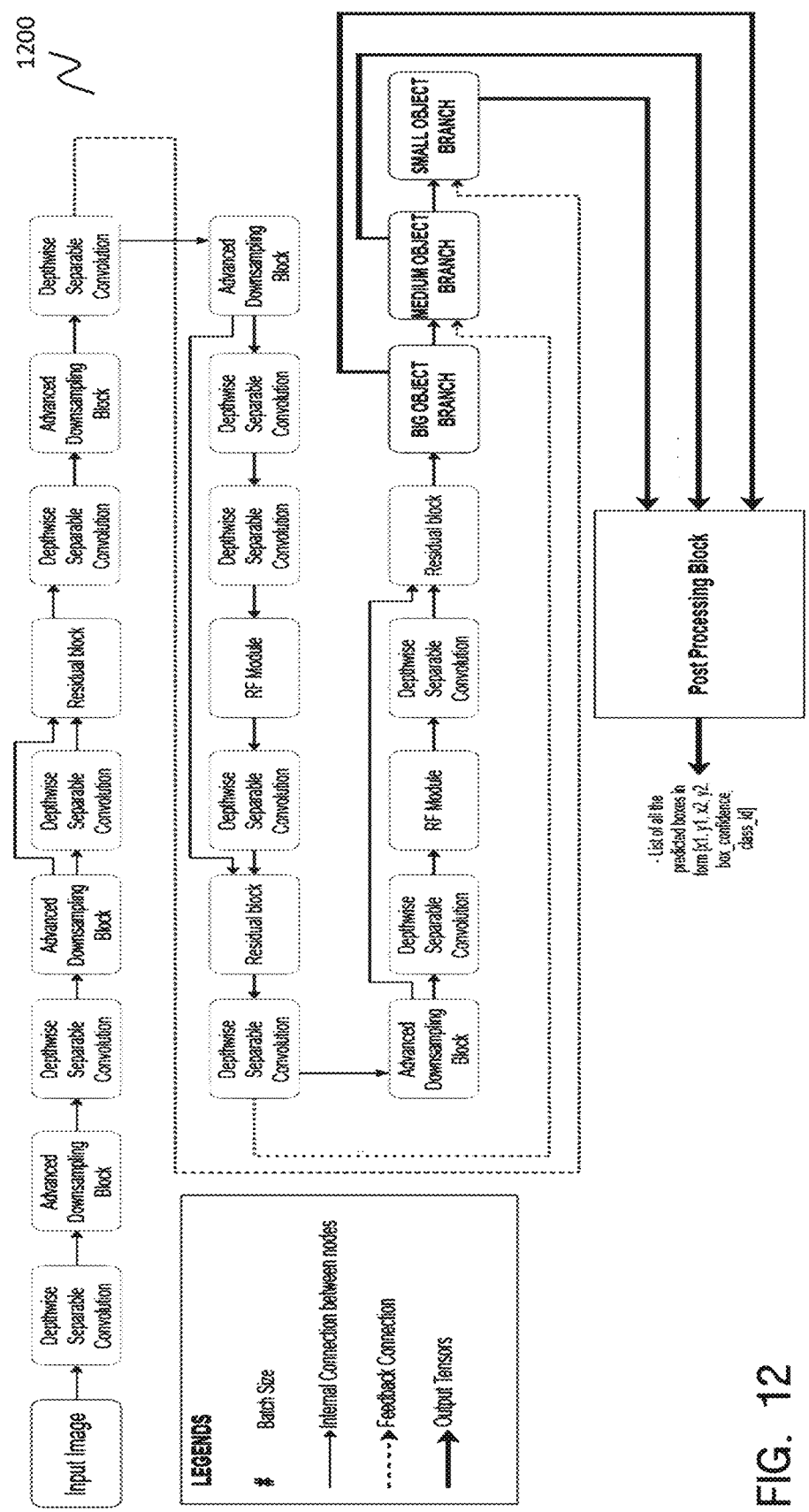
FIG. 12 illustrates a detailed end-to-end model architecture according to an aspect of the present disclosure.

FIG. 12 illustrates a detailed end-to-end model architecture according to an aspect of the present disclosure.

As previously discussed, the whole model architecture 1200 has been divided into two modules, namely, advanced down sampling block, and DCR block. All modules/sub-modules and techniques used throughout the model architecture make use of depth-wise separable convolution in order to save computation time and decrease model size.

In some embodiments, the input image captured by the image capturing device is fed to the model architecture. This image is processed by advanced down sampling and DCR blocks in a manner as described in above paragraphs. In one of the preferred embodiments of the present disclosure, the model makes bounding box prediction using three different branches. As previously discussed in detail, each branch is specialized to predict objects of different sizes. To achieve such a behaviour, the proposed model is designed such that each branch has different receptive field corresponding to the size of the objects they are being trained to predict. The small object branch requires the smallest receptive field, in order to achieve this, the branch responsible from small object predictions is routed early off in the architecture when the receptive field is still low. But doing so, the branch cannot utilise the features extracted by the further computation. The best of both is achieved by taking output from the branch in which more computation is done, resizing it, and concatenating it with the required output branch. A few more convolutions are applied after the concatenation to get the final output. The same procedure is followed by medium object branch in as well. The large object branch requires the largest receptive field hence it does not follow the above procedure.

Figure 13:
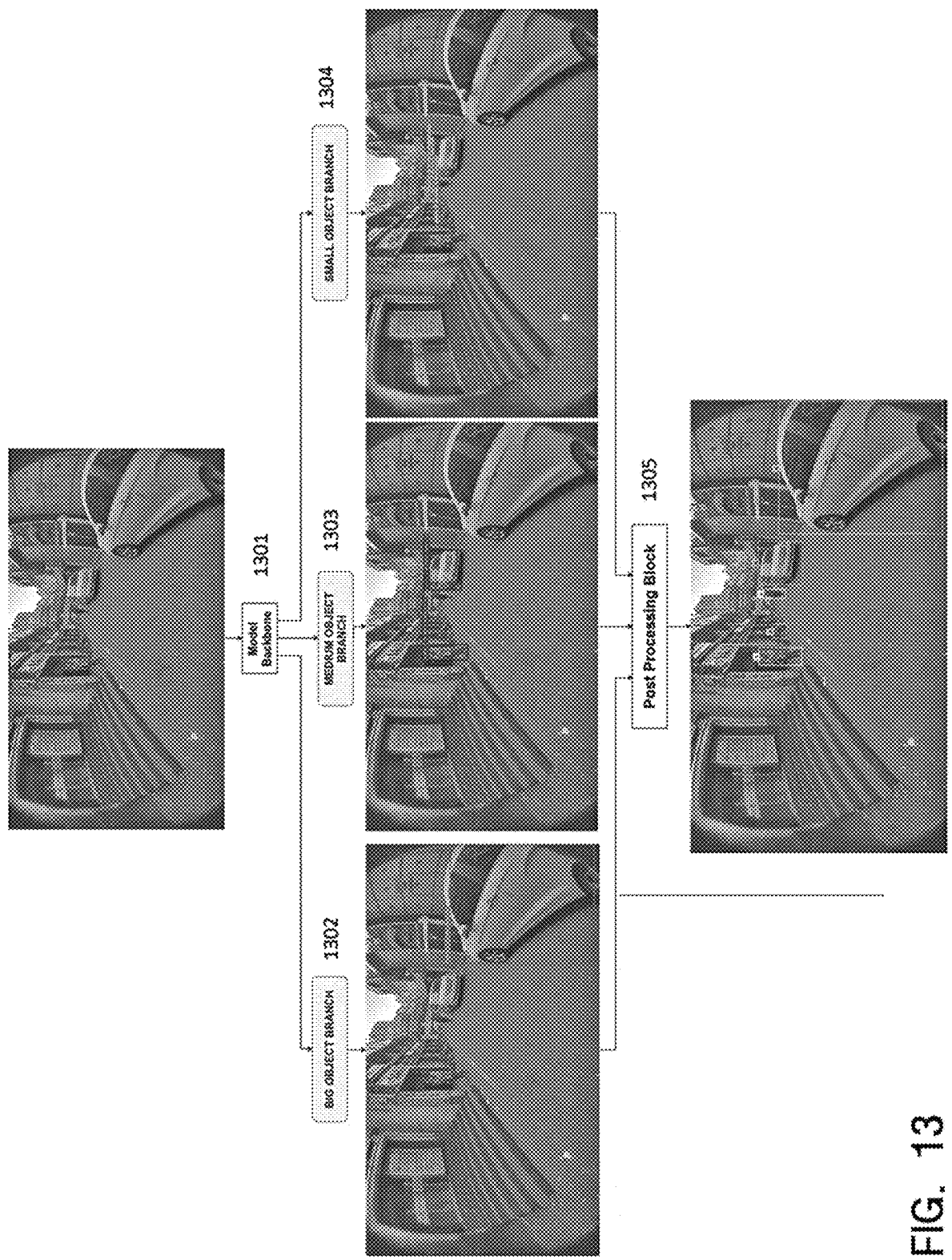
FIG. 13 illustrates effect of receptive field according to an aspect of the present disclosure.

FIG. 13 illustrates effect of receptive field according to an aspect of the present disclosure.

In one of the exemplary embodiments, the input image being passed on to the model is resized into a predetermined size while still maintaining the aspect ratio of the object present in the image. The input image is then fed to the convolution neural network which has branched into 3 different branches. All the model layers before the branching has been abstracted into a block named 'Model Backbone' 1301. The output from 'Model Backbone', goes into 3 different branches, namely, 'Big Object Branch' 1302, 'Medium Object Branch' 1303 and 'Small Object Branch' 1304.

Each branch is configured to have different receptive fields. The big object branch 1302 is having the largest available receptive field in the network, introduced using multiple techniques (like parallel convolutions), hence it can capture the largest object present in the image. The same is convention translated to medium object branch 1303 and small object branch 1304. As can be seen in the provided figure, the object having the largest size is being predicted by 'Big Object Branch', whereas the medium and small objects are being predicted by 'Medium Object Branch' and 'Small Object Branch' respectively. All these predictions are then finally passed onto the post-processing block 1305 which processed and gives the final output image.

Figure 14:
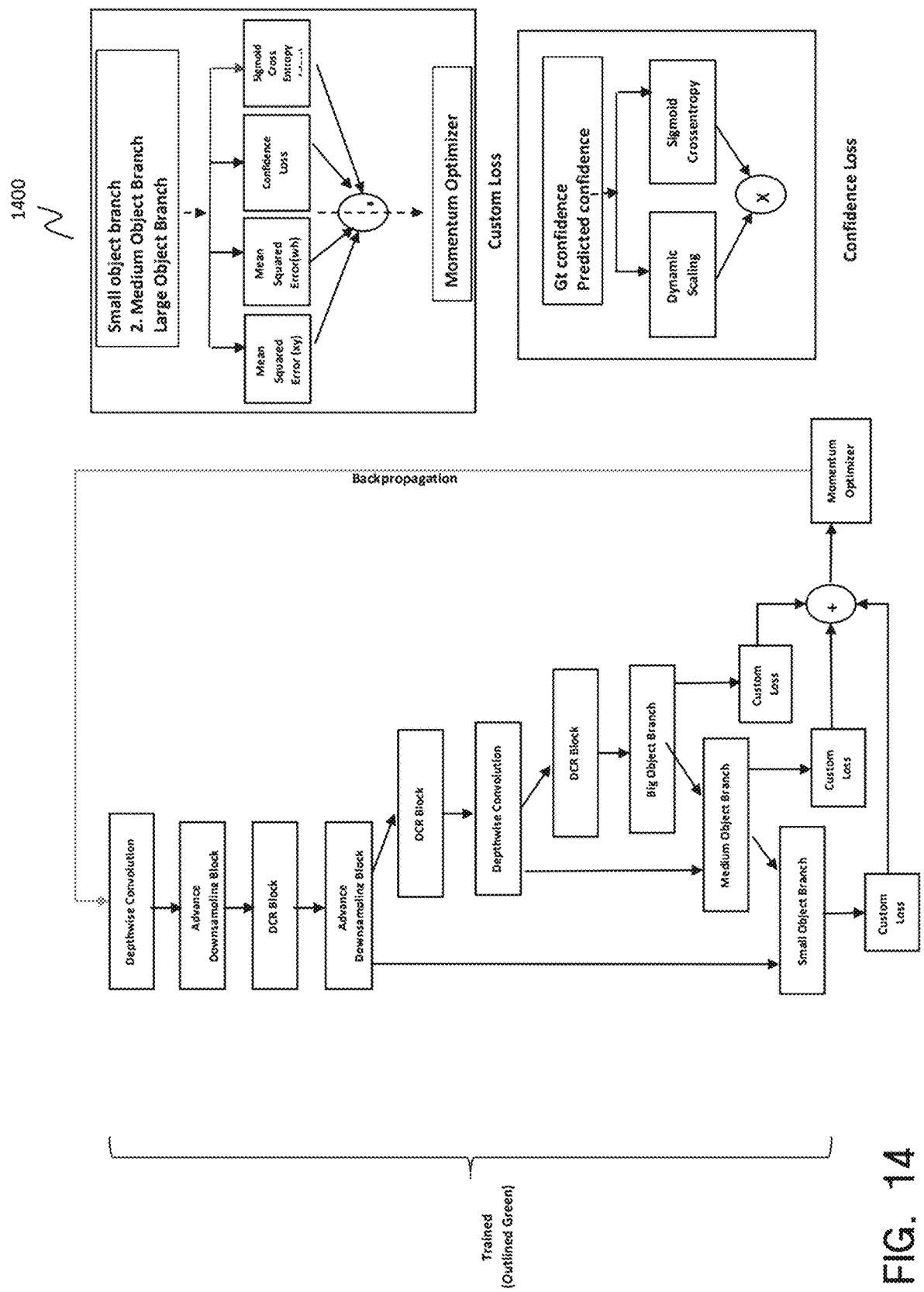
FIG. 14 illustrates a training process of complete architecture according to an aspect of the present disclosure.

FIG. 14 illustrates a training process 1400 of complete architecture according to an aspect of the present disclosure.

In one of the exemplary embodiments, along with the novel model architecture, the loss used for training the model is also a custom loss. The loss used is a combination of MSE (Mean Squared Error or L2) loss and Binary Cross Entropy loss.

$$mse = (gt_{labels} - predicted_{labels})^2$$

$$binary\_cross\_entropy = -[gt_{labels} * \ln(predicted_{labels}) + (1 - gt_{labels}) * \ln(1 - predicted_{labels})]$$

The loss has been divided in four parts, box centre loss (xy loss), box dimensions loss (wh loss), confidence loss and class loss. MSE loss is used for box centre loss and box dimensions loss, binary cross entropy loss is used for confidence and class loss. All these losses are added together for all the branches, and then gradients are calculated according to the loss. These gradients are used for back-propagation through the model in which weights are adjusted along the way. This procedure is repeated several times (for the whole dataset of images) until the loss is within a considerable range.

In order to stabilize the training, a dynamic scaling of the confidence loss is done as it was the most unstable part of loss during the training.

The scaling is done using the equation:

$$scale = alpha * (gt_{confidence} - predicted_{confidence})^{beta}$$

In proposed use case, alpha=0.5, beta=2

Figure 15:
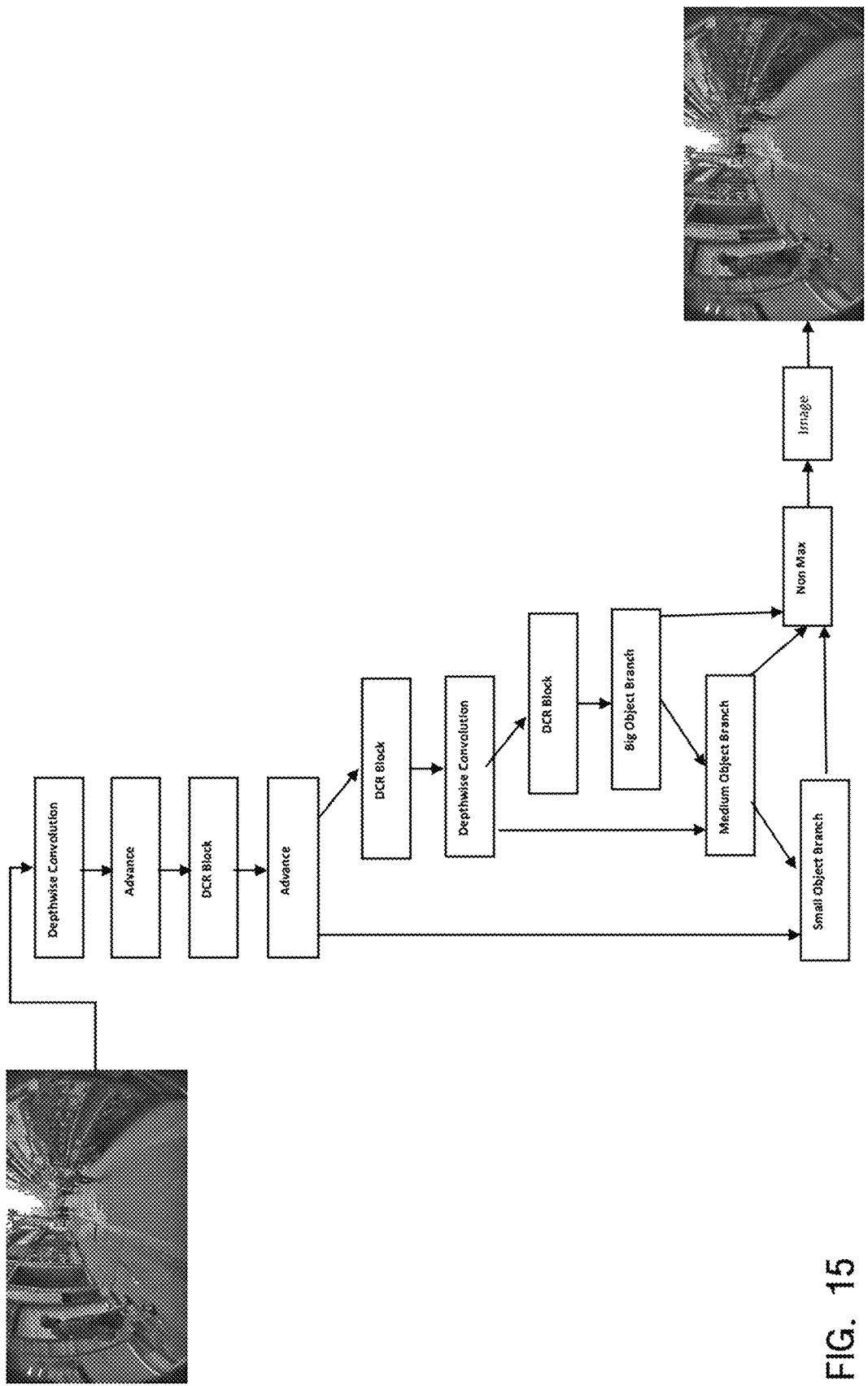
FIG. 15 illustrates an inference process of the architecture to obtain an output image according to an aspect of the present disclosure.

FIG. 15 illustrates an inference process of the architecture to obtain an output image according to an aspect of the present disclosure.

During Inference, loss layers are removed, and the image is fed to network model. The outputs from different branches of the network are marked and concatenated. The output image with objects marked by bounding boxes is plotted at the display device using the Image Plotter.

FIGS. 16*a-g* illustrates different results of object detection according to an aspect of the present disclosure.

Figure 16A:
FIGS. 16a-g illustrates results of object detection in various scenarios according to an aspect of the present disclosure.
Figure 16B:
Figure 16C:
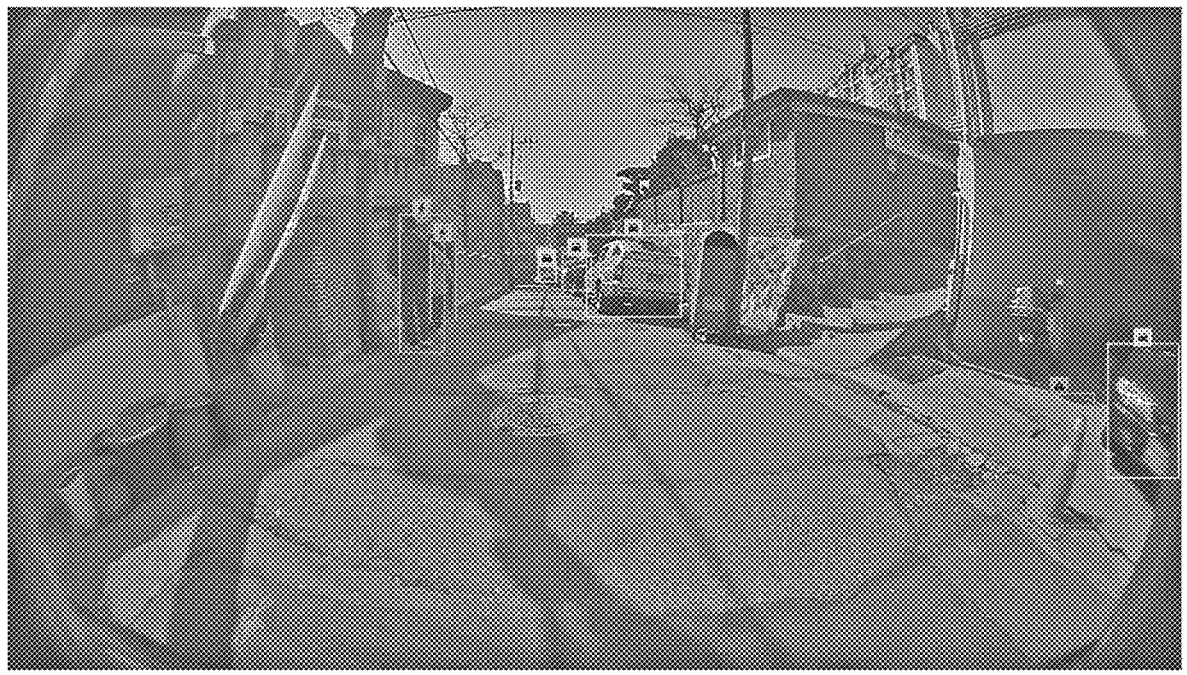
Figure 16D:
Figure 16E:
Figure 16F:
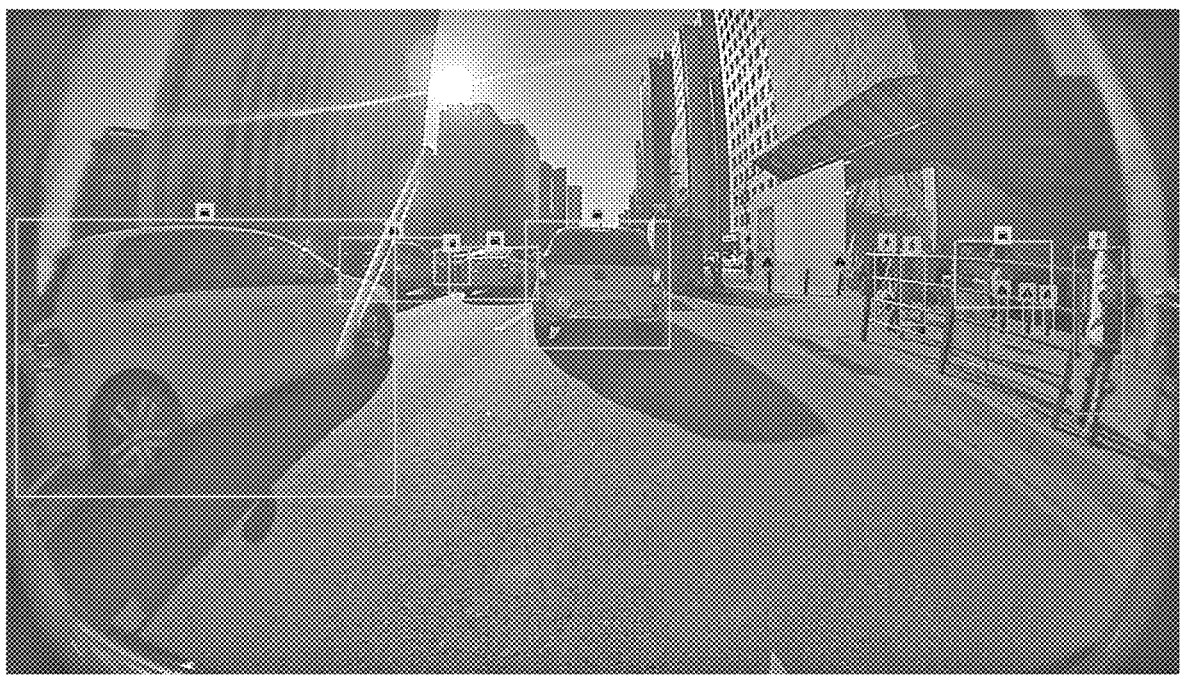
Figure 16G:

It can clearly seen from said figures that the present disclosure is able to efficiently and effectively detect objects at various places such as streets, markets, highway etc., and in different situations when an object is partially visible, occluded or in a clutter. Particularly, FIG. 16*a* provides an output image in highway scenario, FIG. 16*b*, 16*c*, 16*d*, 16*g* provides an output image while pedestrians and vehicle are present on a street road. FIG. 16*e* provides an output image for while pedestrians and vehicle are present on a market road. FIG. 16*f* provides an output image for objects, such as vehicle are in clutter.

Figure 17:
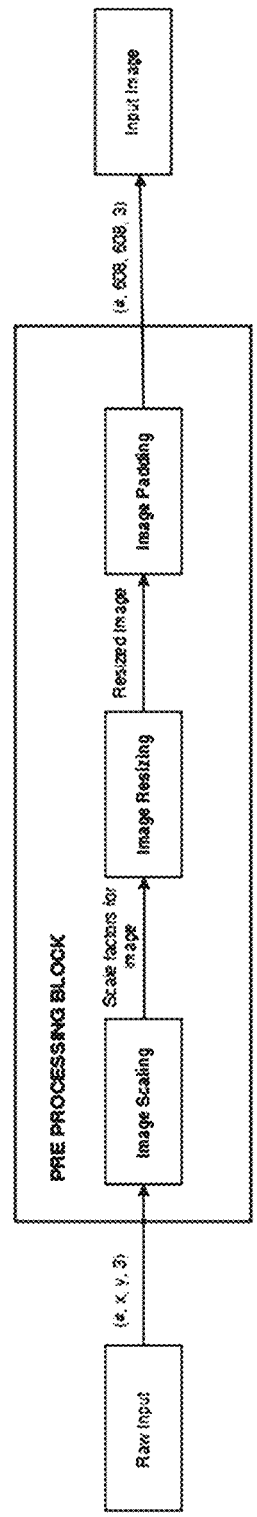
FIG. 17 illustrates a block diagram for preprocessing according to an aspect of the present disclosure.

FIG. 17 illustrates a block diagram for pre-processing according to an aspect of the present disclosure.

In one of the exemplary embodiments, raw input is obtained from the camera sensor of the vehicle. The input image is then scaled to the resolution which the algorithm expects. Scale factors are calculated using image scaling. Using these scale factors the image is resized to an intermediate image. Then 'Image padding" pads the image with zero pixels. The output for the pre-processing block is an image with resolution 608×608.

Figure 18:
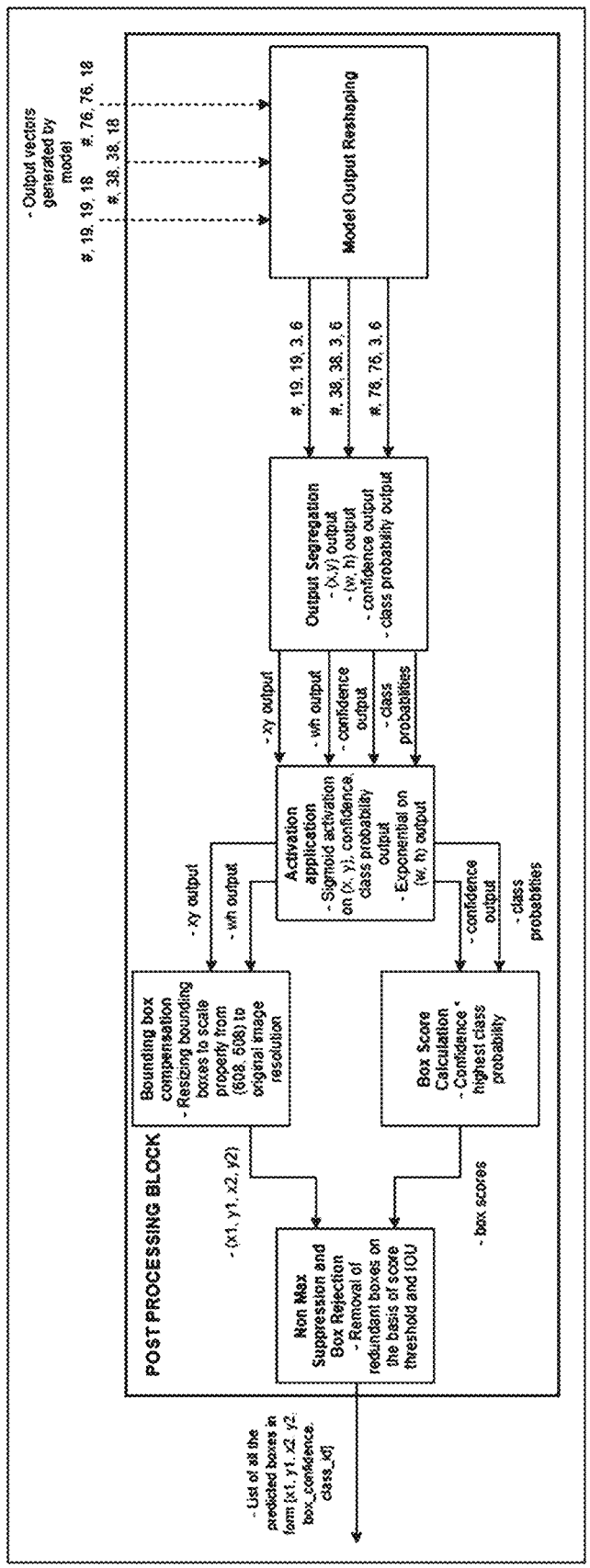
FIG. 18 illustrates a block diagram for post processing according to an aspect of the present disclosure.

FIG. 18 illustrates a block diagram for post-processing according to an aspect of the present disclosure.

In one of the exemplary embodiments, post processing block is used to retrieve meaningful boxes for an image from the output produced by the deep learning model. The output is first reshaped using the 'Model Output Reshaping' block for further processing. After that, 'Output Segregation', segregates the various parameters of bounding boxes like—'xy output'—coordinates for the boxes, 'wh output'—width and height of the boxes, 'confidence output'—confidence of the boxes with which it was predicted, 'class probabilities'—class of the boxes (for eg: pedestrian or background). Various activation functions are applied on the segregated output which are defined in the figure. After that 'xy output' and 'wh output' are used to scale back to the 'Raw input' resolution. 'box scores' are calculated using the 'Box Score Calculation' using the 'confidence output' and 'class probabilities'. 'Non max Suppression' is used to extract meaningful boxes by rejecting redundant boxes.

It may be worth noted that the model is extremely light weight, with all the weights of the model being <1.5 MB, which makes the model suitable for porting into embedded devices. The model takes special care of receptive fields being provided to branches detection varied size objects, which results in reducing the false positives and increasing recognitions. The model is designed very slim keeping in mind the computations to be done on embedded devices. This leads to heavy optimization in the present disclosure. Current solution runs at almost 66 FPS on NVIDIA 1080Ti. (real time).

The foregoing description of the various embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein, and instead the claims should be accorded the widest scope consistent with the principles and novel features disclosed herein.

While the disclosure has been described with reference to a preferred embodiment, it is apparent that variations and modifications will occur without departing the spirit and scope of the disclosure. It is therefore contemplated that the present disclosure covers any and all modifications, variations or equivalents that fall within the scope of the basic underlying principles disclosed above.

We claim:

1. A method for real-time object detection for a host vehicle, the method comprising:
    capturing an image in vicinity of the host vehicle;
    feeding the captured image to a deep fully convolution neural network;
    extracting one or more relevant features from the captured image;
    classifying the extracted features using one or more branches of the deep fully convolution neural network to identify different size of objects, each of the one or more branches comprising a different receptive field corresponding to the size of the object;
    predicting objects present in the image based on a pre-determined confidence threshold;
    marking the predicted objects in the image; and
    plotting the marked image on a display, wherein the different receptive field is created by performing a different number of down sampling and a different number of depth-wise separable convolution to the extracted features.

2. The method of claim 1, wherein the captured image is a Ground Truth (GT) image marked using a Bounding Box annotation tool.

3. The method of claim 1, further comprising reshaping the captured images into a predetermined compatible size, while still maintaining the aspect ratio of the objects present in the image which in turn is fed to the deep fully convolution neural network.

4. The method of claim 1, wherein classifying includes routing the object having a smaller size early off for the prediction in the deep fully convolution neural network.

5. The method of claim 1, wherein the down sampling comprises:
   down sampling a feature map, wherein the feature map is extracted from an image from a plurality of feature vectors, to record the most activated features of the image; and
   simultaneously down sampling the same feature map to maintain a localization information,
   wherein the deep fully convolution neural network comprises down sampling-convolution-receptive block (DCR) technique.

6. The method of claim 1, wherein the predicting objects comprises:
   comparing a confidence score associated with each of intermediary prediction objects to the predetermined confidence threshold; and
   choosing predicted objects having the score above or equal to the predetermined confidence threshold.

7. A system for real-time object detection for a host vehicle, comprising:
   an image sensor configured to capture an image in the vicinity of the host vehicle;
   a controller communicatively connected to the image sensor and configured to:
   obtain the captured from the image sensor;
   feed the captured image to a deep fully convolution neural network;
   extract one or more relevant features from the captured image;
   classify the extracted features using one or more branches of the deep fully convolution neural network to identify different size of objects, each of the or more branches comprising a different receptive field corresponding to the size of the object;
   predict objects present in the image based on a predetermined confidence threshold;
   mark the predicted objects in the image; and
   plot the marked image on a display,
   wherein the different receptive field is created by performing a different number of down sampling and a different number of depth-wise separable convolution to the extracted features.

8. The system of claim 7, wherein the controller is further configured to reshape the captured images into a predetermined compatible size while still maintaining the aspect ratio of the objects present in the image to be fed to the deep fully convolution neural network.

9. The system of claim 7, wherein the controller is further configured to route the object having a smaller size early off, for the prediction in the deep fully convolution neural network.

10. The system of claim 7, wherein the down sampling comprises:
    down sampling a feature map, wherein the feature map is extracted from an image from a plurality of feature vectors, to record the most activated features of the image; and
    simultaneously down sampling the same feature map to maintain a localization information,
    wherein the deep fully convolution neural network comprises down sampling-convolution-receptive block (DCR) technique.

11. The system for object detection of claim 7, wherein the controller is further configured to:
    compare a confidence score associated with each of intermediary prediction objects to the predetermined confidence threshold; and
    choose predicted objects having the score above or equal to the predetermined confidence threshold.

* * * * *